(12) United States Patent
VanGilder et al.

(10) Patent No.: US 9,952,103 B2
(45) Date of Patent: Apr. 24, 2018

(54) ANALYSIS OF EFFECT OF TRANSIENT EVENTS ON TEMPERATURE IN A DATA CENTER

(75) Inventors: James William VanGilder, Pepperell, MA (US); Christopher M. Healey, Chelmsford, MA (US); Xuanhang Zhang, Tewksbury, MA (US)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 600 days.

(21) Appl. No.: 14/366,515

(22) PCT Filed: Dec. 22, 2011

(86) PCT No.: PCT/US2011/066877
§ 371 (c)(1),
(2), (4) Date: Jun. 18, 2014

(87) PCT Pub. No.: WO2013/095516
PCT Pub. Date: Jun. 27, 2013

(65) Prior Publication Data
US 2014/0358471 A1    Dec. 4, 2014

(51) Int. Cl.
*G01K 1/00*   (2006.01)
*G06F 11/30*  (2006.01)
(Continued)

(52) U.S. Cl.
CPC ......... *G01K 1/024* (2013.01); *G06F 17/5004* (2013.01); *G06F 2217/16* (2013.01); *G06F 2217/80* (2013.01)

(58) Field of Classification Search
CPC ............................. G01K 1/024; G06F 17/5004
(Continued)

(56) References Cited

U.S. PATENT DOCUMENTS 1,025,243 A    5/1912   Carpenter et al.
1,941,258 A   12/1933   Gordon
(Continued)

FOREIGN PATENT DOCUMENTS

AU         777375 B2   10/2004
AU      2012201080 A1   3/2012
(Continued)

OTHER PUBLICATIONS

"Enthalpy" Published by the National Aeronautics and Space Administration and edited by Tom Benson. Retrieved on Jul. 13, 2009 from http://www.grc.nasa.gov/WWW/K-12/airplane/enthalpy.html, pp. 3.
(Continued)

*Primary Examiner* — Eman Alkafawi
(74) *Attorney, Agent, or Firm* — Lando & Anastasi, LLP

(57) ABSTRACT

A computer-implemented method for evaluating cooling performance of equipment in a data center. In one aspect, the method comprises receiving data related to equipment in the data center, determining first parameters related to airflow and temperature in the data center at a first period in time, receiving a description of a transient event affecting one of airflow and temperature in the data center at a second time, breaking a second time period subsequent to the second time into a plurality of time intervals, determining second parameters related to airflow in the data center during one of the time intervals, determining the parameters related to temperature in the data center at each of the time intervals based on the second parameters related to airflow, and storing, on a storage device, a representation of the parameters related to temperature in the data center during the second time period.

21 Claims, 13 Drawing Sheets

(51) Int. Cl.
*G01K 1/02* (2006.01)
*G06F 17/50* (2006.01)

(58) Field of Classification Search
USPC .................................................. 702/130, 182
See application file for complete search history.

(56) References Cited

U.S. PATENT DOCUMENTS

| | | |
|---|---|---|
| 2,455,022 A | 11/1948 | Schmidt |
| 3,102,184 A | 8/1963 | Sherron |
| 3,317,798 A | 5/1967 | Chu et al. |
| 3,559,728 A | 2/1971 | Lyman et al. |
| 3,643,007 A | 2/1972 | Roberts et al. |
| 3,665,725 A | 5/1972 | Barlass et al. |
| 3,681,936 A | 8/1972 | Park |
| 3,742,725 A | 7/1973 | Berger |
| 3,810,138 A | 5/1974 | Thompson et al. |
| 3,995,446 A | 12/1976 | Eubank |
| 4,055,053 A | 10/1977 | Elfving et al. |
| 4,065,711 A | 12/1977 | Kawabata |
| 4,127,008 A | 11/1978 | Tyree, Jr. |
| 4,197,716 A | 4/1980 | Nussbaum |
| 4,223,535 A | 9/1980 | Kumm |
| 4,275,570 A | 6/1981 | Szymaszek et al. |
| 4,285,205 A | 8/1981 | Martin et al. |
| 4,338,794 A | 7/1982 | Haasis, Jr. |
| 4,349,879 A | 9/1982 | Peddie et al. |
| 4,352,274 A | 10/1982 | Anderson et al. |
| 4,419,865 A | 12/1983 | Szymaszek |
| 4,515,746 A | 5/1985 | Brun et al. |
| 4,521,645 A | 6/1985 | Carroll |
| 4,535,598 A | 8/1985 | Mount |
| 4,564,767 A | 1/1986 | Charych |
| 4,568,934 A | 2/1986 | Allgood |
| 4,590,538 A | 5/1986 | Cray, Jr. |
| 4,599,873 A | 7/1986 | Hyde |
| 4,636,652 A | 1/1987 | Raes |
| 4,637,020 A | 1/1987 | Schinabeck |
| 4,650,347 A | 3/1987 | Shigemura et al. |
| 4,665,322 A | 5/1987 | Eishima et al. |
| 4,668,939 A | 5/1987 | Kimura et al. |
| 4,673,826 A | 6/1987 | Masson |
| 4,683,529 A | 7/1987 | Bucher, II |
| 4,686,450 A | 8/1987 | Pichat |
| 4,696,168 A | 9/1987 | Woods et al. |
| 4,709,202 A | 11/1987 | Koenck et al. |
| 4,718,025 A | 1/1988 | Minor et al. |
| 4,718,249 A | 1/1988 | Hanson |
| 4,747,041 A | 5/1988 | Engel et al. |
| 4,751,648 A | 6/1988 | Sears, III et al. |
| 4,763,013 A | 8/1988 | Gvoth, Jr. et al. |
| 4,774,631 A | 9/1988 | Okuyama et al. |
| 4,816,208 A | 3/1989 | Woods et al. |
| 4,816,982 A | 3/1989 | Severinsky |
| 4,823,247 A | 4/1989 | Tamoto |
| 4,823,290 A | 4/1989 | Fasack et al. |
| 4,827,151 A | 5/1989 | Okado |
| 4,827,733 A | 5/1989 | Dinh |
| 4,831,508 A | 5/1989 | Hunter |
| 4,837,663 A | 6/1989 | Zushi et al. |
| 4,840,811 A | 6/1989 | Bayerlein et al. |
| 4,851,965 A | 7/1989 | Gabuzda et al. |
| 4,911,231 A | 3/1990 | Horne et al. |
| 4,935,861 A | 6/1990 | Johnson, Jr. et al. |
| 4,937,505 A | 6/1990 | Deglon et al. |
| 4,943,902 A | 7/1990 | Severinsky |
| 4,944,158 A | 7/1990 | Akiike et al. |
| 4,962,734 A | 10/1990 | Jorgensen |
| 4,964,029 A | 10/1990 | Severinsky et al. |
| 4,964,065 A | 10/1990 | Hicks et al. |
| 4,980,812 A | 12/1990 | Johnson, Jr. et al. |
| 5,017,800 A | 5/1991 | Divan |
| 5,019,717 A | 5/1991 | McCurry et al. |
| 5,043,807 A | 8/1991 | Rabii |
| 5,045,989 A | 9/1991 | Higaki et al. |
| 5,047,913 A | 9/1991 | De Doncker et al. |
| 5,047,961 A | 9/1991 | Simonsen |
| 5,057,698 A | 10/1991 | Widener et al. |
| 5,057,968 A | 10/1991 | Morrison |
| 5,061,916 A | 10/1991 | French et al. |
| 5,063,477 A | 11/1991 | Paggen et al. |
| 5,086,385 A | 2/1992 | Launey et al. |
| 5,089,974 A | 2/1992 | Demeyer et al. |
| 5,095,712 A | 3/1992 | Narreau |
| 5,097,328 A | 3/1992 | Boyette |
| 5,099,410 A | 3/1992 | Divan |
| 5,109,278 A | 4/1992 | Erickson et al. |
| 5,126,585 A | 6/1992 | Boys |
| 5,148,043 A | 9/1992 | Hirata et al. |
| 5,150,580 A | 9/1992 | Hyde |
| 5,153,837 A | 10/1992 | Shaffer et al. |
| 5,157,732 A | 10/1992 | Ishii et al. |
| 5,158,132 A | 10/1992 | Guillemot |
| 5,168,171 A | 12/1992 | Tracewell |
| 5,168,724 A | 12/1992 | Gilbertson et al. |
| 5,173,819 A | 12/1992 | Takahashi et al. |
| 5,177,666 A | 1/1993 | Bland et al. |
| 5,181,653 A | 1/1993 | Foster et al. |
| 5,184,025 A | 2/1993 | McCurry et al. |
| 5,189,394 A | 2/1993 | Walter et al. |
| 5,195,706 A | 3/1993 | Allen |
| 5,210,680 A | 5/1993 | Scheibler |
| 5,216,623 A | 6/1993 | Barrett et al. |
| 5,220,522 A | 6/1993 | Wilson et al. |
| 5,225,997 A | 7/1993 | Lederer et al. |
| 5,227,262 A | 7/1993 | Ozer |
| 5,229,850 A | 7/1993 | Toyoshima |
| 5,234,185 A | 8/1993 | Hoffman et al. |
| 5,241,217 A | 8/1993 | Severinsky |
| 5,254,928 A | 10/1993 | Young et al. |
| 5,262,758 A | 11/1993 | Nam et al. |
| 5,269,372 A | 12/1993 | Chu et al. |
| 5,272,382 A | 12/1993 | Heald et al. |
| 5,281,955 A | 1/1994 | Reich et al. |
| 5,289,275 A | 2/1994 | Ishii et al. |
| 5,291,383 A | 3/1994 | Oughton |
| 5,302,858 A | 4/1994 | Folts |
| 5,315,533 A | 5/1994 | Stich et al. |
| 5,319,571 A | 6/1994 | Langer et al. |
| 5,349,282 A | 9/1994 | McClure |
| 5,367,670 A | 11/1994 | Ward et al. |
| 5,381,554 A | 1/1995 | Langer et al. |
| 5,382,893 A | 1/1995 | Dehnel |
| 5,382,943 A | 1/1995 | Tanaka |
| 5,384,792 A | 1/1995 | Hirachi |
| 5,388,422 A | 2/1995 | Hayashida et al. |
| 5,395,042 A | 3/1995 | Riley et al. |
| 5,400,246 A | 3/1995 | Wilson et al. |
| 5,404,136 A | 4/1995 | Marsden |
| 5,409,419 A | 4/1995 | Euchner et al. |
| 5,410,448 A | 4/1995 | Barker, III et al. |
| 5,414,591 A | 5/1995 | Kimura et al. |
| 5,422,558 A | 6/1995 | Stewart |
| 5,440,450 A | 8/1995 | Lau et al. |
| 5,457,377 A | 10/1995 | Jonsson |
| 5,458,991 A | 10/1995 | Severinsky |
| 5,462,225 A | 10/1995 | Massara et al. |
| 5,465,011 A | 11/1995 | Miller et al. |
| 5,475,364 A | 12/1995 | Kenet |
| 5,477,091 A | 12/1995 | Fiorina et al. |
| 5,488,430 A | 1/1996 | Hong |
| 5,491,511 A | 2/1996 | Odle |
| 5,497,288 A | 3/1996 | Otis et al. |
| 5,504,415 A | 4/1996 | Podrazhansky et al. |
| 5,507,529 A | 4/1996 | Martins |
| 5,508,941 A | 4/1996 | Leplingard et al. |
| 5,510,690 A | 4/1996 | Tanaka et al. |
| 5,519,306 A | 5/1996 | Itoh et al. |
| 5,528,507 A | 6/1996 | McNamara et al. |
| 5,533,357 A | 7/1996 | Voorhis |
| 5,540,548 A | 7/1996 | Eberhardt et al. |
| 5,544,012 A | 8/1996 | Koike |
| 5,548,659 A | 8/1996 | Okamoto |
| 5,553,609 A | 9/1996 | Chen et al. |

(56) References Cited

U.S. PATENT DOCUMENTS

| | | |
|---|---|---|
| 5,561,476 A | 10/1996 | Kershaw et al. |
| 5,563,493 A | 10/1996 | Matsuda et al. |
| 5,566,339 A | 10/1996 | Perholtz et al. |
| 5,572,195 A | 11/1996 | Heller et al. |
| 5,572,873 A | 11/1996 | Lavigne et al. |
| 5,579,197 A | 11/1996 | Mengelt et al. |
| 5,581,478 A | 12/1996 | Cruse et al. |
| 5,582,020 A | 12/1996 | Scaringe et al. |
| 5,586,202 A | 12/1996 | Ohki et al. |
| 5,586,250 A | 12/1996 | Carbonneau et al. |
| 5,588,067 A | 12/1996 | Peterson et al. |
| 5,589,764 A | 12/1996 | Lee |
| 5,602,462 A | 2/1997 | Stich et al. |
| 5,602,585 A | 2/1997 | Dickinson et al. |
| 5,621,662 A | 4/1997 | Humphries et al. |
| 5,634,002 A | 5/1997 | Polk et al. |
| 5,642,002 A | 6/1997 | Mekanik et al. |
| 5,649,428 A | 7/1997 | Calton et al. |
| 5,654,591 A | 8/1997 | Mabboux et al. |
| 5,657,641 A | 8/1997 | Cunningham et al. |
| 5,659,470 A | 8/1997 | Goska et al. |
| 5,664,202 A | 9/1997 | Chen et al. |
| 5,682,949 A | 11/1997 | Ratcliffe et al. |
| 5,684,686 A | 11/1997 | Reddy |
| 5,694,780 A | 12/1997 | Alsenz |
| 5,704,219 A | 1/1998 | Suzuki et al. |
| 5,715,160 A | 2/1998 | Plotke |
| 5,718,628 A | 2/1998 | Nakazato et al. |
| 5,731,832 A | 3/1998 | Ng |
| 5,732,074 A | 3/1998 | Spaur et al. |
| 5,732,219 A | 3/1998 | Blumer et al. |
| 5,735,134 A | 4/1998 | Liu et al. |
| 5,742,762 A | 4/1998 | Scholl et al. |
| RE35,793 E | 5/1998 | Halpern |
| 5,749,237 A | 5/1998 | Sandofsky et al. |
| 5,768,430 A | 6/1998 | Takashima et al. |
| 5,794,897 A | 8/1998 | Jobin et al. |
| 5,798,798 A | 8/1998 | Rector et al. |
| 5,802,856 A | 9/1998 | Schaper et al. |
| 5,805,458 A | 9/1998 | McNamara et al. |
| 5,812,055 A | 9/1998 | Candy et al. |
| 5,818,725 A | 10/1998 | McNamara et al. |
| 5,822,302 A | 10/1998 | Scheetz et al. |
| 5,829,130 A | 11/1998 | Miller |
| 5,844,328 A | 12/1998 | Furst |
| 5,845,090 A | 12/1998 | Collins, III et al. |
| 5,850,539 A | 12/1998 | Cook et al. |
| 5,860,012 A | 1/1999 | Luu |
| 5,860,280 A | 1/1999 | Recine, Sr. et al. |
| 5,860,857 A | 1/1999 | Wasastjerna et al. |
| 5,870,698 A | 2/1999 | Riedel et al. |
| 5,872,931 A | 2/1999 | Chivaluri |
| 5,892,440 A | 4/1999 | Bryan |
| 5,896,922 A | 4/1999 | Chrysler et al. |
| 5,901,057 A | 5/1999 | Brand et al. |
| 5,905,867 A | 5/1999 | Giorgio |
| 5,910,045 A | 6/1999 | Aoki et al. |
| 5,914,858 A | 6/1999 | McKeen et al. |
| 5,923,103 A | 7/1999 | Pulizzi et al. |
| 5,926,210 A | 7/1999 | Hackett et al. |
| 5,937,092 A | 8/1999 | Wootton et al. |
| 5,937,097 A | 8/1999 | Lennon |
| 5,940,274 A | 8/1999 | Sato et al. |
| 5,949,974 A | 9/1999 | Ewing et al. |
| 5,953,930 A | 9/1999 | Chu et al. |
| 5,954,127 A | 9/1999 | Chrysler et al. |
| 5,955,946 A | 9/1999 | Beheshti et al. |
| 5,959,240 A | 9/1999 | Yoshida et al. |
| 5,960,204 A | 9/1999 | Yinger et al. |
| 5,963,425 A | 10/1999 | Chrysler et al. |
| 5,963,457 A | 10/1999 | Kanoi et al. |
| 5,968,116 A | 10/1999 | Day, II et al. |
| 5,968,398 A | 10/1999 | Schmitt et al. |
| 5,970,731 A | 10/1999 | Hare et al. |
| 5,970,734 A | 10/1999 | Stillwell et al. |
| 5,972,196 A | 10/1999 | Murphy et al. |
| 5,974,237 A | 10/1999 | Shurmer et al. |
| 5,978,594 A | 11/1999 | Bonnell et al. |
| 5,978,912 A | 11/1999 | Rakavy et al. |
| 5,982,618 A | 11/1999 | Roos |
| 5,982,652 A | 11/1999 | Simonelli et al. |
| 5,984,144 A | 11/1999 | Wyatt |
| 5,987,614 A | 11/1999 | Mitchell et al. |
| 5,991,885 A | 11/1999 | Chang et al. |
| 5,995,729 A | 11/1999 | Hirosawa et al. |
| 5,999,403 A | 12/1999 | Neustadt |
| 6,000,232 A | 12/1999 | Witten-Hannah et al. |
| 6,001,065 A | 12/1999 | DeVito |
| 6,002,237 A | 12/1999 | Gaza |
| 6,006,171 A | 12/1999 | Vines et al. |
| 6,023,935 A | 2/2000 | Okazaki et al. |
| 6,032,472 A | 3/2000 | Heinrichs et al. |
| 6,034,872 A | 3/2000 | Chrysler et al. |
| 6,038,879 A | 3/2000 | Turcotte et al. |
| 6,046,920 A | 4/2000 | Cazabat et al. |
| 6,052,282 A | 4/2000 | Sugiyama et al. |
| 6,052,750 A | 4/2000 | Lea |
| 6,055,480 A | 4/2000 | Nevo et al. |
| 6,057,834 A | 5/2000 | Pickover |
| 6,058,434 A | 5/2000 | Wilt et al. |
| 6,069,412 A | 5/2000 | Raddi et al. |
| 6,075,698 A | 6/2000 | Hogan et al. |
| 6,078,253 A | 6/2000 | Fowler |
| 6,078,957 A | 6/2000 | Adelman et al. |
| 6,081,606 A | 6/2000 | Hansen et al. |
| 6,085,243 A | 7/2000 | Fletcher et al. |
| 6,088,225 A | 7/2000 | Parry et al. |
| 6,088,816 A | 7/2000 | Nouri et al. |
| 6,094,676 A | 7/2000 | Gray et al. |
| 6,100,806 A | 8/2000 | Gaukel |
| 6,101,459 A | 8/2000 | Tavallaei et al. |
| 6,104,607 A | 8/2000 | Behl |
| 6,104,755 A | 8/2000 | Ohara |
| 6,104,868 A | 8/2000 | Peters et al. |
| 6,105,061 A | 8/2000 | Nakai |
| 6,108,782 A | 8/2000 | Fletcher et al. |
| 6,111,036 A | 8/2000 | Wonders et al. |
| 6,112,235 A | 8/2000 | Spofford |
| 6,112,237 A | 8/2000 | Donaldson et al. |
| 6,115,468 A | 9/2000 | De Nicolo |
| 6,121,695 A | 9/2000 | Loh |
| 6,122,603 A | 9/2000 | Budike, Jr. |
| 6,122,639 A | 9/2000 | Babu et al. |
| 6,125,145 A | 9/2000 | Koyanagi et al. |
| 6,128,016 A | 10/2000 | Coelho et al. |
| 6,134,511 A | 10/2000 | Subbarao |
| 6,138,078 A | 10/2000 | Canada et al. |
| 6,138,249 A | 10/2000 | Nolet |
| 6,139,177 A | 10/2000 | Venkatraman et al. |
| 6,141,762 A | 10/2000 | Nicol et al. |
| 6,144,770 A | 11/2000 | Lennon |
| 6,145,502 A | 11/2000 | Lyons et al. |
| 6,148,262 A | 11/2000 | Fry |
| 6,157,943 A | 12/2000 | Meyer |
| 6,160,584 A | 12/2000 | Yanagita |
| 6,160,926 A | 12/2000 | Dow et al. |
| 6,164,369 A | 12/2000 | Stoller |
| 6,167,406 A | 12/2000 | Hoskins et al. |
| 6,169,669 B1 | 1/2001 | Choudhury |
| 6,170,007 B1 | 1/2001 | Venkatraman et al. |
| 6,173,323 B1 | 1/2001 | Moghe |
| 6,175,866 B1 | 1/2001 | Holloway et al. |
| 6,175,886 B1 | 1/2001 | Usami |
| 6,175,927 B1 | 1/2001 | Cromer et al. |
| 6,177,884 B1 | 1/2001 | Hunt et al. |
| 6,181,103 B1 | 1/2001 | Chen |
| 6,182,094 B1 | 1/2001 | Humpleman et al. |
| 6,182,157 B1 | 1/2001 | Schlener et al. |
| 6,184,593 B1 | 2/2001 | Jungreis |
| 6,189,109 B1 | 2/2001 | Sheikh et al. |
| 6,191,500 B1 | 2/2001 | Toy |
| 6,195,018 B1 | 2/2001 | Ragle et al. |
| 6,198,628 B1 | 3/2001 | Smith |
| 6,199,204 B1 | 3/2001 | Donohue |

(56) References Cited

U.S. PATENT DOCUMENTS

| | | |
|---|---|---|
| 6,201,319 B1 | 3/2001 | Simonelli et al. |
| 6,201,371 B1 | 3/2001 | Kawabe et al. |
| 6,208,261 B1 | 3/2001 | Olstead |
| 6,208,345 B1 | 3/2001 | Sheard et al. |
| 6,208,510 B1 | 3/2001 | Trudeau et al. |
| 6,209,330 B1 | 4/2001 | Timmerman et al. |
| 6,213,194 B1 | 4/2001 | Chrysler et al. |
| 6,215,287 B1 | 4/2001 | Matsushiro et al. |
| 6,215,404 B1 | 4/2001 | Morales |
| 6,216,482 B1 | 4/2001 | Xiao et al. |
| 6,216,956 B1 | 4/2001 | Ehlers et al. |
| 6,219,628 B1 | 4/2001 | Kodosky et al. |
| 6,222,729 B1 | 4/2001 | Yoshikawa |
| 6,223,810 B1 | 5/2001 | Chu et al. |
| 6,229,429 B1 | 5/2001 | Horon |
| 6,236,332 B1 | 5/2001 | Conkright et al. |
| 6,237,353 B1 | 5/2001 | Sishtla et al. |
| 6,246,780 B1 | 6/2001 | Sato |
| 6,246,969 B1 | 6/2001 | Sinclair et al. |
| 6,252,770 B1 | 6/2001 | Yu et al. |
| 6,259,232 B1 | 7/2001 | Douglass et al. |
| 6,259,956 B1 | 7/2001 | Myers et al. |
| 6,266,721 B1 | 7/2001 | Sheikh et al. |
| 6,271,845 B1 | 8/2001 | Richardson |
| 6,274,950 B1 | 8/2001 | Gottlieb et al. |
| 6,276,161 B1 | 8/2001 | Peiffer et al. |
| 6,281,790 B1 | 8/2001 | Kimmel et al. |
| 6,282,546 B1 | 8/2001 | Gleichauf et al. |
| 6,288,897 B1 | 9/2001 | Fritschle et al. |
| 6,292,379 B1 | 9/2001 | Edevold et al. |
| 6,298,144 B1 | 10/2001 | Pucker, II et al. |
| 6,304,900 B1 | 10/2001 | Cromer et al. |
| 6,305,180 B1 | 10/2001 | Miller et al. |
| 6,310,783 B1 | 10/2001 | Winch et al. |
| 6,311,105 B1 | 10/2001 | Budike, Jr. |
| 6,311,214 B1 | 10/2001 | Rhoads |
| 6,317,320 B1 | 11/2001 | Cosley et al. |
| 6,317,348 B1 | 11/2001 | Vackar |
| 6,318,783 B1 | 11/2001 | Knox |
| 6,324,644 B1 | 11/2001 | Rakavy et al. |
| 6,327,143 B1 | 12/2001 | Bonstrom et al. |
| 6,329,792 B1 | 12/2001 | Dunn et al. |
| 6,330,176 B1 | 12/2001 | Thrap et al. |
| 6,332,202 B1 | 12/2001 | Sheikh et al. |
| 6,332,335 B1 | 12/2001 | Kajimoto et al. |
| 6,338,094 B1 | 1/2002 | Scott et al. |
| 6,338,437 B1 | 1/2002 | Kline et al. |
| 6,343,320 B1 | 1/2002 | Fairchild et al. |
| 6,347,627 B1 | 2/2002 | Frankie et al. |
| 6,360,255 B1 | 3/2002 | McCormack et al. |
| 6,363,421 B2 | 3/2002 | Barker et al. |
| 6,363,422 B1 | 3/2002 | Hunter et al. |
| 6,368,064 B1 | 4/2002 | Bendikas et al. |
| 6,373,840 B1 | 4/2002 | Chen |
| 6,374,296 B1 | 4/2002 | Lim et al. |
| 6,374,627 B1 | 4/2002 | Schumacher et al. |
| 6,375,561 B1 | 4/2002 | Nicolai et al. |
| 6,375,614 B1 | 4/2002 | Braun et al. |
| 6,381,156 B1 | 4/2002 | Sakai et al. |
| 6,381,700 B1 | 4/2002 | Yoshida |
| 6,389,464 B1 | 5/2002 | Krishnamurthy et al. |
| 6,396,534 B1 | 5/2002 | Mahler et al. |
| 6,400,043 B1 | 6/2002 | Batson et al. |
| 6,400,103 B1 | 6/2002 | Adamson |
| 6,400,591 B2 | 6/2002 | Reilly et al. |
| 6,400,996 B1 | 6/2002 | Hoffberg et al. |
| 6,402,691 B1 | 6/2002 | Peddicord et al. |
| 6,404,348 B1 | 6/2002 | Wilfong |
| 6,405,216 B1 | 6/2002 | Minnaert et al. |
| 6,406,257 B1 | 6/2002 | Houdek |
| 6,412,292 B2 | 7/2002 | Spinazzola et al. |
| 6,415,628 B1 | 7/2002 | Ahmed et al. |
| 6,424,119 B1 | 7/2002 | Nelson et al. |
| 6,433,444 B1 | 8/2002 | de Vries |
| 6,437,691 B1 | 8/2002 | Sandelman et al. |
| 6,438,978 B1 | 8/2002 | Bessler |
| 6,445,088 B1 | 9/2002 | Spitaels et al. |
| 6,449,745 B1 | 9/2002 | Kim et al. |
| 6,455,954 B1 | 9/2002 | Dailey |
| 6,457,076 B1 | 9/2002 | Cheng et al. |
| 6,459,579 B1 | 10/2002 | Farmer et al. |
| 6,462,944 B1 | 10/2002 | Lin |
| 6,463,997 B1 | 10/2002 | Nicolai et al. |
| 6,474,087 B1 | 11/2002 | Lifson |
| 6,477,667 B1 | 11/2002 | Levi et al. |
| 6,483,730 B2 | 11/2002 | Johnson, Jr. |
| 6,489,561 B2 | 12/2002 | Ziegler et al. |
| 6,493,243 B1 | 12/2002 | Real |
| 6,494,050 B2 | 12/2002 | Spinazzola et al. |
| 6,496,105 B2 | 12/2002 | Fisher et al. |
| 6,505,086 B1 | 1/2003 | Dodd, Jr. et al. |
| 6,505,256 B1 | 1/2003 | York |
| 6,510,350 B1 | 1/2003 | Steen, III et al. |
| 6,529,230 B1 | 3/2003 | Chong |
| 6,529,936 B1 | 3/2003 | Mayo et al. |
| 6,535,382 B2 | 3/2003 | Bishop et al. |
| 6,553,336 B1 | 4/2003 | Johnson et al. |
| 6,553,418 B1 | 4/2003 | Collins et al. |
| 6,557,357 B2 | 5/2003 | Spinazzola et al. |
| 6,557,624 B1 | 5/2003 | Stahl et al. |
| 6,565,428 B2 | 5/2003 | Hsiao |
| 6,574,104 B2 | 6/2003 | Patel et al. |
| 6,574,970 B2 | 6/2003 | Spinazzola et al. |
| 6,575,234 B2 | 6/2003 | Nelson |
| 6,584,329 B1 | 6/2003 | Wendelrup et al. |
| 6,591,279 B1 | 7/2003 | Emens et al. |
| 6,611,428 B1 | 8/2003 | Wong |
| 6,611,866 B1 | 8/2003 | Goldman |
| 6,639,383 B2 | 10/2003 | Nelson et al. |
| 6,640,145 B2 | 10/2003 | Hoffberg et al. |
| 6,640,889 B1 | 11/2003 | Harte et al. |
| 6,654,265 B2 | 11/2003 | Sadler et al. |
| 6,658,595 B1 | 12/2003 | Thamattoor |
| 6,661,678 B2 | 12/2003 | Raddi et al. |
| 6,662,576 B1 | 12/2003 | Bai |
| 6,668,565 B1 | 12/2003 | Johnson et al. |
| 6,672,955 B2 | 1/2004 | Charron |
| 6,681,787 B2 | 1/2004 | Tinsley et al. |
| 6,682,100 B2 | 1/2004 | Wood et al. |
| 6,682,159 B2 | 1/2004 | Compagnucci |
| 6,686,838 B1 | 2/2004 | Rezvani et al. |
| 6,694,759 B1 | 2/2004 | Bash et al. |
| 6,695,577 B1 | 2/2004 | Susek |
| 6,700,351 B2 | 3/2004 | Blair et al. |
| 6,704,196 B1 | 3/2004 | Rodriguez et al. |
| 6,704,199 B2 | 3/2004 | Wiley |
| 6,711,264 B1 | 3/2004 | Matsumoto et al. |
| 6,714,977 B1 | 3/2004 | Fowler et al. |
| 6,718,277 B2 | 4/2004 | Sharma |
| 6,718,364 B2 | 4/2004 | Connelly et al. |
| 6,718,781 B2 | 4/2004 | Freund et al. |
| 6,721,672 B2 | 4/2004 | Spitaels et al. |
| 6,722,151 B2 | 4/2004 | Spinazzola et al. |
| 6,724,624 B1 | 4/2004 | Dodson |
| 6,728,119 B2 | 4/2004 | Reilly et al. |
| 6,737,840 B2 | 5/2004 | McDonald et al. |
| 6,745,579 B2 | 6/2004 | Spinazzola et al. |
| 6,745,590 B1 | 6/2004 | Johnson et al. |
| 6,756,998 B1 | 6/2004 | Bilger |
| 6,757,185 B2 | 6/2004 | Rojas Romero |
| 6,761,212 B2 | 7/2004 | DiPaolo |
| 6,775,137 B2 | 8/2004 | Chu et al. |
| 6,778,386 B2 | 8/2004 | Garnett et al. |
| 6,788,535 B2 | 9/2004 | Dodgen et al. |
| 6,795,928 B2 | 9/2004 | Bradley et al. |
| 6,801,940 B1 | 10/2004 | Moran et al. |
| 6,803,678 B2 | 10/2004 | Gottlieb et al. |
| 6,804,616 B2 | 10/2004 | Bodas |
| 6,804,975 B2 | 10/2004 | Park |
| 6,814,134 B1 | 11/2004 | Pravda |
| 6,819,560 B2 | 11/2004 | Konshak et al. |
| 6,819,563 B1 | 11/2004 | Chu et al. |
| 6,822,859 B2 | 11/2004 | Coglitore et al. |
| 6,827,142 B2 | 12/2004 | Winkler et al. |

(56) References Cited

U.S. PATENT DOCUMENTS

| | | |
|---|---|---|
| 6,829,630 B1 | 12/2004 | Pajak et al. |
| 6,832,504 B1 | 12/2004 | Birkmann |
| 6,838,925 B1 | 1/2005 | Nielsen |
| 6,848,989 B2 | 2/2005 | Miyazaki et al. |
| 6,850,426 B2 | 2/2005 | Kojori et al. |
| 6,853,097 B2 | 2/2005 | Matsuda et al. |
| 6,853,564 B2 | 2/2005 | Kravitz |
| 6,859,366 B2 | 2/2005 | Fink |
| 6,859,882 B2 | 2/2005 | Fung |
| 6,862,179 B2 | 3/2005 | Beitelmal et al. |
| 6,880,349 B2 | 4/2005 | Johnson et al. |
| 6,881,142 B1 | 4/2005 | Nair |
| 6,886,353 B2 | 5/2005 | Patel et al. |
| 6,889,752 B2 | 5/2005 | Stoller |
| 6,889,908 B2 | 5/2005 | Crippen et al. |
| 6,901,767 B2 | 6/2005 | Wood |
| 6,924,981 B2 | 8/2005 | Chu et al. |
| 6,927,977 B2 | 8/2005 | Singer |
| 6,927,980 B2 | 8/2005 | Fukuda et al. |
| 6,944,035 B2 | 9/2005 | Raddi et al. |
| 6,955,058 B2 | 10/2005 | Taras et al. |
| 6,959,558 B2 | 11/2005 | Bean, Jr. et al. |
| 6,964,539 B2 | 11/2005 | Bradley et al. |
| 6,967,283 B2 | 11/2005 | Rasmussen et al. |
| 6,967,841 B1 | 11/2005 | Chu et al. |
| 6,973,797 B2 | 12/2005 | Nemit, Jr. |
| 6,973,801 B1 | 12/2005 | Campbell et al. |
| 6,980,433 B2 | 12/2005 | Fink |
| 6,983,212 B2 | 1/2006 | Burns |
| 6,990,513 B2 | 1/2006 | Belfiore et al. |
| 7,000,416 B2 | 2/2006 | Hirooka et al. |
| 7,000,467 B2 | 2/2006 | Chu et al. |
| 7,005,759 B2 | 2/2006 | Ying et al. |
| 7,012,807 B2 | 3/2006 | Chu et al. |
| 7,012,825 B2 | 3/2006 | Nielsen |
| 7,020,586 B2 | 3/2006 | Snevely |
| 7,031,870 B2 | 4/2006 | Sharma et al. |
| 7,032,119 B2 | 4/2006 | Fung |
| 7,033,267 B2 | 4/2006 | Rasmussen |
| 7,046,514 B2 | 5/2006 | Fink et al. |
| 7,047,300 B1 | 5/2006 | Oehrke et al. |
| 7,051,096 B1 | 5/2006 | Krawiec et al. |
| 7,051,802 B2 | 5/2006 | Baer |
| 7,051,946 B2 | 5/2006 | Bash et al. |
| 7,065,600 B2 | 6/2006 | Papa et al. |
| 7,082,541 B2 | 7/2006 | Hammond et al. |
| 7,085,133 B2 | 8/2006 | Hall |
| 7,086,247 B2 | 8/2006 | Campbell et al. |
| 7,091,625 B2 | 8/2006 | Okusawa et al. |
| 7,104,081 B2 | 9/2006 | Chu et al. |
| 7,106,590 B2 | 9/2006 | Chu et al. |
| 7,112,131 B2 | 9/2006 | Rasmussen et al. |
| 7,120,021 B2 | 10/2006 | Hamman |
| 7,120,689 B2 | 10/2006 | Gonsalves et al. |
| 7,126,409 B2 | 10/2006 | Nielsen |
| 7,140,193 B2 | 11/2006 | Johnson et al. |
| 7,145,772 B2 | 12/2006 | Fink |
| 7,146,353 B2 | 12/2006 | Garg et al. |
| 7,148,796 B2 | 12/2006 | Joy et al. |
| 7,155,318 B2 | 12/2006 | Sharma et al. |
| 7,159,022 B2 | 1/2007 | Primm et al. |
| 7,165,412 B1 | 1/2007 | Bean, Jr. |
| 7,173,820 B2 | 2/2007 | Fink et al. |
| 7,184,269 B2 | 2/2007 | Campbell et al. |
| 7,187,549 B2 | 3/2007 | Teneketges et al. |
| 7,197,433 B2 | 3/2007 | Patel et al. |
| 7,206,824 B2 | 4/2007 | Somashekar et al. |
| 7,207,041 B2 | 4/2007 | Elson et al. |
| 7,228,707 B2 | 6/2007 | Lifson et al. |
| 7,236,363 B2 | 6/2007 | Belady |
| 7,239,043 B2 | 7/2007 | Taimela et al. |
| 7,251,547 B2 | 7/2007 | Bash et al. |
| 7,254,307 B2 | 8/2007 | Xin |
| 7,259,963 B2 | 8/2007 | Germagian et al. |
| 7,270,174 B2 | 9/2007 | Chu et al. |
| 7,272,005 B2 | 9/2007 | Campbell et al. |
| 7,274,112 B2 | 9/2007 | Hjort et al. |
| 7,274,566 B2 | 9/2007 | Campbell et al. |
| 7,278,273 B1 | 10/2007 | Whitted et al. |
| 7,284,379 B2 | 10/2007 | Pham et al. |
| 7,292,898 B2 | 11/2007 | Clark et al. |
| 7,293,666 B2 | 11/2007 | Mattlin et al. |
| 7,298,617 B2 | 11/2007 | Campbell et al. |
| 7,298,618 B2 | 11/2007 | Campbell et al. |
| 7,313,503 B2 | 12/2007 | Nakagawa et al. |
| 7,315,448 B1 | 1/2008 | Bash et al. |
| 7,319,594 B2 | 1/2008 | Nicolai et al. |
| 7,330,886 B2 | 2/2008 | Childers et al. |
| 7,334,630 B2 | 2/2008 | Goodson et al. |
| 7,365,973 B2 | 4/2008 | Rasmussen et al. |
| 7,366,632 B2 | 4/2008 | Hamann et al. |
| 7,378,165 B2 | 5/2008 | Brignone et al. |
| 7,392,309 B2 | 6/2008 | Childers et al. |
| 7,402,921 B2 | 7/2008 | Ingemi et al. |
| 7,403,391 B2 | 7/2008 | Germagian et al. |
| 7,406,839 B2 | 8/2008 | Bean et al. |
| 7,418,825 B1 | 9/2008 | Bean, Jr. |
| 7,421,575 B2 | 9/2008 | Ang et al. |
| 7,426,453 B2 | 9/2008 | Patel et al. |
| 7,462,453 B2 | 12/2008 | Yamada et al. |
| 7,472,043 B1 | 12/2008 | Low et al. |
| 7,500,911 B2 | 3/2009 | Johnson et al. |
| 7,529,838 B2 | 5/2009 | Primm et al. |
| 7,558,649 B1 | 7/2009 | Sharma et al. |
| 7,568,360 B1 | 8/2009 | Bash et al. |
| 7,596,476 B2 | 9/2009 | Rasmussen et al. |
| 7,606,760 B2 | 10/2009 | Hutchison et al. |
| 7,620,480 B2 | 11/2009 | Patel et al. |
| 7,657,347 B2 | 2/2010 | Campbell et al. |
| 7,676,280 B1 | 3/2010 | Bash et al. |
| 7,681,404 B2 | 3/2010 | Bean, Jr. |
| 7,698,389 B2 | 4/2010 | Sesek et al. |
| 7,705,489 B2 | 4/2010 | Nielsen et al. |
| 7,726,144 B2 | 6/2010 | Larson et al. |
| 7,752,858 B2 | 7/2010 | Johnson et al. |
| 7,775,055 B2 | 8/2010 | Bean et al. |
| 7,791,882 B2 | 9/2010 | Chu et al. |
| 7,799,474 B2 | 9/2010 | Lyon et al. |
| 7,832,925 B2 | 11/2010 | Archibald et al. |
| 7,844,440 B2 | 11/2010 | Nasle et al. |
| 7,862,410 B2 | 1/2011 | McMahan et al. |
| 7,878,888 B2 | 2/2011 | Rasmussen et al. |
| 7,881,910 B2 | 2/2011 | Rasmussen et al. |
| 7,885,795 B2 | 2/2011 | Rasmussen et al. |
| 7,908,126 B2 | 3/2011 | Bahel et al. |
| 7,925,389 B2 | 4/2011 | Bradicich et al. |
| 7,975,156 B2 | 7/2011 | Artman et al. |
| 7,979,250 B2 | 7/2011 | Archibald et al. |
| 7,991,592 B2 | 8/2011 | VanGilder et al. |
| 8,143,744 B2 | 3/2012 | Nielsen et al. |
| 8,155,922 B2 | 4/2012 | Loucks |
| 8,201,028 B2 | 6/2012 | Sawczak et al. |
| 8,209,056 B2 | 6/2012 | Rasmussen et al. |
| 8,219,362 B2 | 7/2012 | Shrivastava et al. |
| 8,228,046 B2 | 7/2012 | Ingemi et al. |
| 8,229,713 B2 | 7/2012 | Hamann et al. |
| 8,244,502 B2 | 8/2012 | Hamann et al. |
| 8,249,825 B2 | 8/2012 | VanGilder et al. |
| 8,315,841 B2 | 11/2012 | Rasmussen et al. |
| 8,322,155 B2 | 12/2012 | Tutunoglu et al. |
| 8,327,656 B2 | 12/2012 | Tutunoglu et al. |
| 8,425,287 B2 | 4/2013 | Wexler |
| 8,473,265 B2 | 6/2013 | Hlasny et al. |
| 8,509,959 B2 | 8/2013 | Zhang et al. |
| 8,554,515 B2 | 10/2013 | VanGilder et al. |
| 8,639,482 B2 | 1/2014 | Rasmussen et al. |
| 8,825,451 B2 | 9/2014 | VanGilder et al. |
| 8,965,748 B2 * | 2/2015 | Iyengar ............... G06F 17/5009 703/21 |
| 8,972,217 B2 | 3/2015 | VanGilder et al. |
| 2001/0005894 A1 | 6/2001 | Fukui |
| 2001/0009361 A1 | 7/2001 | Downs et al. |
| 2001/0012579 A1 | 8/2001 | Vackar |
| 2001/0023258 A1 | 9/2001 | Dean et al. |

(56) References Cited

U.S. PATENT DOCUMENTS

| | | |
|---|---|---|
| 2001/0029163 A1 | 10/2001 | Spinazzola et al. |
| 2001/0042616 A1 | 11/2001 | Baer |
| 2001/0047213 A1 | 11/2001 | Sepe |
| 2001/0047387 A1 | 11/2001 | Brockhurst |
| 2001/0047410 A1 | 11/2001 | Defosse |
| 2001/0052006 A1 | 12/2001 | Barker et al. |
| 2001/0055965 A1 | 12/2001 | Delp et al. |
| 2002/0003575 A1 | 1/2002 | Marchese |
| 2002/0004912 A1 | 1/2002 | Fung |
| 2002/0007643 A1 | 1/2002 | Spinazzola et al. |
| 2002/0023258 A1 | 2/2002 | Elwahab et al. |
| 2002/0041603 A1 | 4/2002 | Kato |
| 2002/0043969 A1 | 4/2002 | Duncan et al. |
| 2002/0055909 A1 | 5/2002 | Fung et al. |
| 2002/0059804 A1 | 5/2002 | Spinazzola et al. |
| 2002/0062454 A1 | 5/2002 | Fung |
| 2002/0071031 A1 | 6/2002 | Lord et al. |
| 2002/0072868 A1 | 6/2002 | Bartone et al. |
| 2002/0074096 A1 | 6/2002 | Wierer et al. |
| 2002/0083378 A1 | 6/2002 | Nickels |
| 2002/0095971 A1 | 7/2002 | Pawson |
| 2002/0101973 A1 | 8/2002 | Teixeira |
| 2002/0108386 A1 | 8/2002 | Spinazzola et al. |
| 2002/0112054 A1 | 8/2002 | Hatanaka |
| 2002/0119339 A1 | 8/2002 | Ragland et al. |
| 2002/0121555 A1 | 9/2002 | Cipolla et al. |
| 2002/0124081 A1 | 9/2002 | Primm et al. |
| 2002/0129355 A1 | 9/2002 | Velten et al. |
| 2002/0130648 A1 | 9/2002 | Raddi et al. |
| 2002/0134096 A1 | 9/2002 | Shim et al. |
| 2002/0134567 A1 | 9/2002 | Rasmussen et al. |
| 2002/0136042 A1 | 9/2002 | Layden et al. |
| 2002/0149911 A1 | 10/2002 | Bishop et al. |
| 2002/0152298 A1 | 10/2002 | Kikta et al. |
| 2002/0161885 A1 | 10/2002 | Childers et al. |
| 2002/0174223 A1 | 11/2002 | Childers et al. |
| 2002/0191425 A1 | 12/2002 | Geissler |
| 2002/0195997 A1 | 12/2002 | Peek et al. |
| 2003/0019221 A1 | 1/2003 | Rossi et al. |
| 2003/0033550 A1 | 2/2003 | Kuiawa et al. |
| 2003/0042004 A1 | 3/2003 | Novotny et al. |
| 2003/0048006 A1 | 3/2003 | Shelter et al. |
| 2003/0048647 A1 | 3/2003 | Sadler et al. |
| 2003/0052644 A1 | 3/2003 | Nelson et al. |
| 2003/0084357 A1 | 5/2003 | Bresniker et al. |
| 2003/0084358 A1 | 5/2003 | Bresniker et al. |
| 2003/0084359 A1 | 5/2003 | Bresniker et al. |
| 2003/0098789 A1 | 5/2003 | Murakami et al. |
| 2003/0115000 A1 | 6/2003 | Bodas |
| 2003/0115024 A1 | 6/2003 | Snevely |
| 2003/0120780 A1 | 6/2003 | Zhu et al. |
| 2003/0121689 A1 | 7/2003 | Rasmussen et al. |
| 2003/0147214 A1 | 8/2003 | Patel et al. |
| 2003/0147216 A1 | 8/2003 | Patel et al. |
| 2003/0154285 A1 | 8/2003 | Berglund et al. |
| 2003/0158718 A1 | 8/2003 | Nakagawa et al. |
| 2003/0184975 A1 | 10/2003 | Steinman et al. |
| 2003/0188208 A1 | 10/2003 | Fung |
| 2003/0190935 A1 | 10/2003 | Pinder |
| 2003/0193777 A1 | 10/2003 | Friedrich et al. |
| 2003/0196126 A1 | 10/2003 | Fung |
| 2003/0200130 A1 | 10/2003 | Kall et al. |
| 2003/0200295 A1 | 10/2003 | Roberts et al. |
| 2003/0200473 A1 | 10/2003 | Fung |
| 2003/0204756 A1 | 10/2003 | Ransom et al. |
| 2003/0206021 A1 | 11/2003 | Laletin et al. |
| 2003/0214507 A1 | 11/2003 | Mawatari et al. |
| 2003/0220026 A1 | 11/2003 | Oki et al. |
| 2003/0232598 A1 | 12/2003 | Aljadeff et al. |
| 2003/0235035 A1 | 12/2003 | Wintersteen et al. |
| 2003/0236822 A1 | 12/2003 | Graupner et al. |
| 2004/0003266 A1 | 1/2004 | Moshir et al. |
| 2004/0010569 A1 | 1/2004 | Thomas et al. |
| 2004/0016243 A1 | 1/2004 | Song et al. |
| 2004/0020224 A1 | 2/2004 | Bash et al. |
| 2004/0031280 A1 | 2/2004 | Martin et al. |
| 2004/0031282 A1 | 2/2004 | Kopko |
| 2004/0057211 A1 | 3/2004 | Kondo et al. |
| 2004/0061030 A1 | 4/2004 | Goodwin et al. |
| 2004/0065097 A1 | 4/2004 | Bash et al. |
| 2004/0065100 A1 | 4/2004 | Jacobsen |
| 2004/0065104 A1 | 4/2004 | Bash et al. |
| 2004/0073597 A1 | 4/2004 | Caveney et al. |
| 2004/0075343 A1 | 4/2004 | Wareham et al. |
| 2004/0075984 A1 | 4/2004 | Bash et al. |
| 2004/0078708 A1 | 4/2004 | Li et al. |
| 2004/0083012 A1 | 4/2004 | Miller |
| 2004/0084967 A1 | 5/2004 | Nielsen |
| 2004/0089009 A1 | 5/2004 | Bash et al. |
| 2004/0089011 A1 | 5/2004 | Patel et al. |
| 2004/0098991 A1 | 5/2004 | Heyes |
| 2004/0099747 A1 | 5/2004 | Johnson et al. |
| 2004/0100770 A1 | 5/2004 | Chu et al. |
| 2004/0104706 A1 | 6/2004 | Ooi et al. |
| 2004/0120331 A1 | 6/2004 | Rhine et al. |
| 2004/0120855 A1 | 6/2004 | Reichel et al. |
| 2004/0155526 A1 | 8/2004 | Naden et al. |
| 2004/0160210 A1 | 8/2004 | Bohne et al. |
| 2004/0160720 A1 | 8/2004 | Yamanashi et al. |
| 2004/0160789 A1 | 8/2004 | Ying et al. |
| 2004/0160897 A1 | 8/2004 | Fowler et al. |
| 2004/0163001 A1 | 8/2004 | Bodas |
| 2004/0163102 A1 | 8/2004 | Fowler et al. |
| 2004/0184232 A1 | 9/2004 | Fink |
| 2004/0186905 A1 | 9/2004 | Young et al. |
| 2004/0189161 A1 | 9/2004 | Davis et al. |
| 2004/0190247 A1 | 9/2004 | Chu et al. |
| 2004/0196853 A1 | 10/2004 | Saito et al. |
| 2004/0223300 A1 | 11/2004 | Fink et al. |
| 2004/0227435 A1 | 11/2004 | Rasmussen |
| 2004/0230848 A1 | 11/2004 | Mayo et al. |
| 2004/0240514 A1 | 12/2004 | Bash et al. |
| 2004/0242197 A1 | 12/2004 | Fontaine |
| 2004/0262409 A1 | 12/2004 | Crippen et al. |
| 2005/0001589 A1 | 1/2005 | Edington et al. |
| 2005/0016189 A1 | 1/2005 | Wacker |
| 2005/0023363 A1 | 2/2005 | Sharma et al. |
| 2005/0036248 A1 | 2/2005 | Klikic et al. |
| 2005/0044882 A1 | 3/2005 | Hong et al. |
| 2005/0048896 A1 | 3/2005 | Shaben |
| 2005/0055590 A1 | 3/2005 | Farkas et al. |
| 2005/0061013 A1 | 3/2005 | Bond |
| 2005/0063542 A1 | 3/2005 | Ryu |
| 2005/0071699 A1 | 3/2005 | Hammond et al. |
| 2005/0108582 A1 | 5/2005 | Fung |
| 2005/0111669 A1 | 5/2005 | Park et al. |
| 2005/0114507 A1 | 5/2005 | Tarui et al. |
| 2005/0132729 A1 | 6/2005 | Manole |
| 2005/0159098 A1 | 7/2005 | Johnson et al. |
| 2005/0162019 A1 | 7/2005 | Masciarelli et al. |
| 2005/0162129 A1 | 7/2005 | Mutabdzija et al. |
| 2005/0162836 A1 | 7/2005 | Briggs et al. |
| 2005/0164563 A1 | 7/2005 | Schuttler et al. |
| 2005/0168073 A1 | 8/2005 | Hjort |
| 2005/0170770 A1 | 8/2005 | Johnson et al. |
| 2005/0177755 A1 | 8/2005 | Fung |
| 2005/0182523 A1 | 8/2005 | Nair |
| 2005/0185654 A1 | 8/2005 | Zadikian et al. |
| 2005/0198247 A1 | 9/2005 | Perry et al. |
| 2005/0198981 A1 | 9/2005 | Arno |
| 2005/0201127 A1 | 9/2005 | Tracy et al. |
| 2005/0205241 A1 | 9/2005 | Goodson et al. |
| 2005/0207909 A1 | 9/2005 | Bean et al. |
| 2005/0210905 A1 | 9/2005 | Burns et al. |
| 2005/0213306 A1 | 9/2005 | Vos et al. |
| 2005/0225936 A1 | 10/2005 | Day |
| 2005/0228618 A1 | 10/2005 | Patel et al. |
| 2005/0235671 A1 | 10/2005 | Belady et al. |
| 2005/0237715 A1 | 10/2005 | Staben et al. |
| 2005/0237716 A1 | 10/2005 | Chu et al. |
| 2005/0246431 A1 | 11/2005 | Spitaels |
| 2005/0247829 A1 | 11/2005 | Low et al. |
| 2005/0248922 A1 | 11/2005 | Chu et al. |
| 2005/0251802 A1 | 11/2005 | Bozek et al. |

(56) References Cited

U.S. PATENT DOCUMENTS

| | | |
|---|---|---|
| 2005/0267639 A1 | 12/2005 | Sharma et al. |
| 2005/0275976 A1 | 12/2005 | Taimela et al. |
| 2005/0278075 A1 | 12/2005 | Rasmussen et al. |
| 2005/0284169 A1 | 12/2005 | Tamura et al. |
| 2006/0002086 A1 | 1/2006 | Teneketges et al. |
| 2006/0015712 A1 | 1/2006 | Ang et al. |
| 2006/0025010 A1 | 2/2006 | Spitaels et al. |
| 2006/0042289 A1 | 3/2006 | Campbell et al. |
| 2006/0043792 A1 | 3/2006 | Hjort et al. |
| 2006/0043793 A1 | 3/2006 | Hjort et al. |
| 2006/0043797 A1 | 3/2006 | Hjort et al. |
| 2006/0044846 A1 | 3/2006 | Hjort et al. |
| 2006/0072262 A1 | 4/2006 | Paik et al. |
| 2006/0080001 A1 | 4/2006 | Bash et al. |
| 2006/0081545 A1 | 4/2006 | Rassmussen et al. |
| 2006/0082263 A1 | 4/2006 | Rimler et al. |
| 2006/0096306 A1 | 5/2006 | Okaza et al. |
| 2006/0102575 A1 | 5/2006 | Mattlin et al. |
| 2006/0108481 A1 | 5/2006 | Riedy et al. |
| 2006/0112286 A1 | 5/2006 | Whalley et al. |
| 2006/0115586 A1 | 6/2006 | Xing et al. |
| 2006/0121421 A1 | 6/2006 | Spitaels et al. |
| 2006/0126296 A1 | 6/2006 | Campbell et al. |
| 2006/0139877 A1 | 6/2006 | Germagian et al. |
| 2006/0144073 A1 | 7/2006 | Lee et al. |
| 2006/0162357 A1 | 7/2006 | Fink et al. |
| 2006/0168975 A1 | 8/2006 | Malone et al. |
| 2006/0170967 A1 | 8/2006 | Maki et al. |
| 2006/0203834 A1 | 9/2006 | Augustinus |
| 2006/0214014 A1 | 9/2006 | Bash et al. |
| 2006/0232945 A1 | 10/2006 | Chu et al. |
| 2006/0238941 A1 | 10/2006 | Ingemi et al. |
| 2006/0242288 A1 | 10/2006 | Masurkar |
| 2006/0250770 A1 | 11/2006 | Campbell et al. |
| 2006/0260338 A1 | 11/2006 | VanGilder et al. |
| 2006/0267974 A1 | 11/2006 | Kato et al. |
| 2006/0276121 A1 | 12/2006 | Rasmussen |
| 2006/0279970 A1 | 12/2006 | Kernahan |
| 2007/0019569 A1 | 1/2007 | Park et al. |
| 2007/0025271 A1 | 2/2007 | Niedrich et al. |
| 2007/0038414 A1 | 2/2007 | Rasmussen et al. |
| 2007/0055409 A1 | 3/2007 | Rasmussen et al. |
| 2007/0064363 A1 | 3/2007 | Nielsen et al. |
| 2007/0072536 A1 | 3/2007 | Johnson et al. |
| 2007/0074537 A1 | 4/2007 | Bean et al. |
| 2007/0076373 A1 | 4/2007 | Fink |
| 2007/0078634 A1 | 4/2007 | Krishnapillai |
| 2007/0078635 A1 | 4/2007 | Rasmussen et al. |
| 2007/0081302 A1 | 4/2007 | Nicolai et al. |
| 2007/0085678 A1 | 4/2007 | Joy et al. |
| 2007/0088822 A1 | 4/2007 | Coile et al. |
| 2007/0088823 A1 | 4/2007 | Fowler et al. |
| 2007/0091569 A1 | 4/2007 | Campbell et al. |
| 2007/0091570 A1 | 4/2007 | Campbell et al. |
| 2007/0121295 A1 | 5/2007 | Campbell et al. |
| 2007/0129000 A1 | 6/2007 | Rasmussen et al. |
| 2007/0146994 A1 | 6/2007 | Germagian et al. |
| 2007/0150215 A1 | 6/2007 | Spitaels et al. |
| 2007/0150584 A1 | 6/2007 | Srinivasan |
| 2007/0163748 A1 | 7/2007 | Rasmussen et al. |
| 2007/0165377 A1 | 7/2007 | Rasmussen et al. |
| 2007/0167125 A1 | 7/2007 | Rasmussen et al. |
| 2007/0171613 A1 | 7/2007 | McMahan et al. |
| 2007/0174024 A1 | 7/2007 | Rasmussen et al. |
| 2007/0187343 A1 | 8/2007 | Colucci et al. |
| 2007/0190919 A1 | 8/2007 | Donovan et al. |
| 2007/0213000 A1 | 9/2007 | Day |
| 2007/0228837 A1 | 10/2007 | Nielsen et al. |
| 2007/0271475 A1 | 11/2007 | Hatasaki et al. |
| 2007/0274035 A1 | 11/2007 | Fink et al. |
| 2007/0291817 A1 | 12/2007 | Bradicich et al. |
| 2008/0002364 A1 | 1/2008 | Campbell et al. |
| 2008/0004837 A1 | 1/2008 | Zwinger et al. |
| 2008/0037217 A1 | 2/2008 | Murakami et al. |
| 2008/0041076 A1 | 2/2008 | Tutunoglu et al. |
| 2008/0041077 A1 | 2/2008 | Tutunoglu |
| 2008/0042491 A1 | 2/2008 | Klikic et al. |
| 2008/0055850 A1 | 3/2008 | Carlson et al. |
| 2008/0055852 A1 | 3/2008 | Uluc et al. |
| 2008/0061628 A1 | 3/2008 | Nielsen et al. |
| 2008/0067872 A1 | 3/2008 | Moth |
| 2008/0104985 A1 | 5/2008 | Carlsen |
| 2008/0105412 A1 | 5/2008 | Carlsen et al. |
| 2008/0105753 A1 | 5/2008 | Carlsen et al. |
| 2008/0141703 A1 | 6/2008 | Bean, Jr. |
| 2008/0142068 A1 | 6/2008 | Bean et al. |
| 2008/0144375 A1 | 6/2008 | Cheng |
| 2008/0157601 A1 | 7/2008 | Masciarelli et al. |
| 2008/0174954 A1 | 7/2008 | VanGilder et al. |
| 2008/0177424 A1 | 7/2008 | Wheeler |
| 2008/0180908 A1 | 7/2008 | Wexler |
| 2008/0197706 A1 | 8/2008 | Nielsen |
| 2008/0198549 A1 | 8/2008 | Rasmussen et al. |
| 2008/0229318 A1 | 9/2008 | Franke |
| 2008/0245083 A1 | 10/2008 | Tutunoglu et al. |
| 2008/0263150 A1 | 10/2008 | Childers et al. |
| 2008/0272744 A1 | 11/2008 | Melanson |
| 2009/0007591 A1 | 1/2009 | Bean et al. |
| 2009/0019875 A1 | 1/2009 | Fink et al. |
| 2009/0030554 A1 | 1/2009 | Bean, Jr. et al. |
| 2009/0039706 A1 | 2/2009 | Kotlyar et al. |
| 2009/0046415 A1 | 2/2009 | Rasmussen et al. |
| 2009/0064046 A1 | 3/2009 | Childers et al. |
| 2009/0121547 A1 | 5/2009 | Paik et al. |
| 2009/0121860 A1 | 5/2009 | Kimmel et al. |
| 2009/0138313 A1 | 5/2009 | Morgan et al. |
| 2009/0138888 A1 | 5/2009 | Shah et al. |
| 2009/0150123 A1 | 6/2009 | Archibald et al. |
| 2009/0164031 A1 | 6/2009 | Johnson et al. |
| 2009/0168345 A1 | 7/2009 | Martini |
| 2009/0205416 A1 | 8/2009 | Campbell et al. |
| 2009/0210097 A1 | 8/2009 | Sawczak et al. |
| 2009/0223234 A1 | 9/2009 | Campbell et al. |
| 2009/0259343 A1 | 10/2009 | Rasmussen et al. |
| 2009/0268404 A1 | 10/2009 | Chu et al. |
| 2009/0276771 A1 | 11/2009 | Nickolov et al. |
| 2009/0308579 A1 | 12/2009 | Johnson et al. |
| 2009/0309570 A1 | 12/2009 | Lehmann et al. |
| 2009/0326879 A1 | 12/2009 | Hamann et al. |
| 2009/0326884 A1 | 12/2009 | Amemiya et al. |
| 2010/0057263 A1 | 3/2010 | Tutunoglu |
| 2010/0106464 A1 | 4/2010 | Hlasny et al. |
| 2010/0131109 A1 | 5/2010 | Rasmussen et al. |
| 2010/0170663 A1 | 7/2010 | Bean, Jr. |
| 2010/0211669 A1 | 8/2010 | Dalgas et al. |
| 2010/0211810 A1 | 8/2010 | Zacho |
| 2010/0256959 A1 | 10/2010 | VanGilder et al. |
| 2010/0286956 A1 | 11/2010 | VanGilder et al. |
| 2010/0287018 A1 | 11/2010 | Shrivastava et al. |
| 2010/0305718 A1 | 12/2010 | Clark et al. |
| 2011/0040529 A1 | 2/2011 | Hamann et al. |
| 2011/0213508 A1 | 9/2011 | Mandagere et al. |
| 2011/0215645 A1* | 9/2011 | Schomburg ............. H02J 9/061 307/65 |
| 2011/0246147 A1 | 10/2011 | Rasmussen et al. |
| 2011/0301911 A1 | 12/2011 | VanGilder et al. |
| 2011/0307820 A1 | 12/2011 | Rasmussen et al. |
| 2011/0316706 A1 | 12/2011 | Cash et al. |
| 2012/0041569 A1 | 2/2012 | Zhang et al. |
| 2012/0071992 A1 | 3/2012 | VanGilder et al. |
| 2012/0158387 A1 | 6/2012 | VanGilder et al. |
| 2012/0170205 A1 | 7/2012 | Healey et al. |
| 2012/0221872 A1 | 8/2012 | Artman et al. |
| 2012/0245905 A1 | 9/2012 | Dalgas et al. |
| 2012/0253769 A1 | 10/2012 | Poondru et al. |
| 2013/0006426 A1 | 1/2013 | Healey et al. |
| 2013/0030585 A1 | 1/2013 | Rasmussen et al. |
| 2013/0095494 A1 | 4/2013 | Neely |
| 2013/0139530 A1 | 6/2013 | Tutunoglu et al. |

(56) References Cited

U.S. PATENT DOCUMENTS

| | | | |
|---|---|---|---|
| 2013/0297267 A1* | 11/2013 | Liang | G06F 17/5009 703/2 |
| 2014/0358471 A1 | 12/2014 | VanGilder et al. | |

FOREIGN PATENT DOCUMENTS

| | | |
|---|---|---|
| CA | 2300053 A1 | 2/1999 |
| CA | 2310275 A1 | 6/1999 |
| CA | 2328939 A1 | 9/1999 |
| CA | 2395450 A1 | 5/2001 |
| CN | 87100353 A | 9/1988 |
| CN | 1294350 A | 5/2001 |
| CN | 1485906 A | 3/2004 |
| CN | 2612211 Y | 4/2004 |
| CN | 101089779 A | 12/2007 |
| CN | 101132688 A | 2/2008 |
| CN | 101589656 A | 11/2009 |
| CN | 201514313 U | 6/2010 |
| CN | 102096460 A | 6/2011 |
| CN | 102224474 A | 10/2011 |
| CN | 102265278 A | 11/2011 |
| CN | 102414685 A | 4/2012 |
| CN | 102414686 A | 4/2012 |
| CN | 102436296 A | 5/2012 |
| CN | 102449606 A | 5/2012 |
| DE | 10128367 A1 | 1/2003 |
| DE | 102006041788 A1 | 3/2008 |
| EP | 0574628 A1 | 12/1993 |
| EP | 0 591 585 B1 | 4/1994 |
| EP | 0602911 A1 | 6/1994 |
| EP | 0444997 B1 | 2/1995 |
| EP | 0575060 B1 | 9/1996 |
| EP | 0738065 A1 | 10/1996 |
| EP | 0741269 A2 | 11/1996 |
| EP | 0859489 A2 | 8/1998 |
| EP | 0917034 A1 | 5/1999 |
| EP | 0 927 933 A2 | 7/1999 |
| EP | 0964551 A1 | 12/1999 |
| EP | 0977112 A2 | 2/2000 |
| EP | 0978780 A1 | 2/2000 |
| EP | 0990986 A2 | 4/2000 |
| EP | 1 009 130 A1 | 6/2000 |
| EP | 1014622 A2 | 6/2000 |
| EP | 1 049 291 A2 | 11/2000 |
| EP | 1 096 724 A1 | 5/2001 |
| EP | 1107519 A2 | 6/2001 |
| EP | 1115264 A2 | 7/2001 |
| EP | 1124301 A2 | 8/2001 |
| EP | 1 150 188 A2 | 10/2001 |
| EP | 0963076 A3 | 11/2001 |
| EP | 1 178 628 A2 | 2/2002 |
| EP | 1291999 A1 | 3/2003 |
| EP | 1610077 A2 | 12/2005 |
| EP | 1672300 A1 | 6/2006 |
| EP | 1705977 A1 | 9/2006 |
| EP | 1 990 986 A1 | 11/2008 |
| EP | 2482213 A1 | 8/2012 |
| FR | 2193303 A1 | 2/1974 |
| FR | 2624684 A1 | 6/1989 |
| FR | 2831019 A1 | 4/2003 |
| FR | 2864854 A1 | 7/2005 |
| GB | 2335124 A | 9/1999 |
| GB | 2343036 A | 4/2000 |
| GB | 2344718 A | 6/2000 |
| GB | 2351205 A | 12/2000 |
| GB | 2354066 A | 3/2001 |
| GB | 2355163 A | 4/2001 |
| GB | 2359369 A | 8/2001 |
| GB | 2361156 A | 10/2001 |
| JP | 9-64555 A | 3/1974 |
| JP | 63-127042 A | 5/1988 |
| JP | 1-163541 A | 6/1989 |
| JP | 3-85797 | 4/1991 |
| JP | 3099398 A | 4/1991 |
| JP | 5-15423 | 1/1993 |
| JP | 5040889 A | 2/1993 |
| JP | 5-160592 A | 6/1993 |
| JP | 6105376 A | 4/1994 |
| JP | 6119581 A | 4/1994 |
| JP | 6-272694 A | 9/1994 |
| JP | 07-044275 A | 2/1995 |
| JP | 7-98781 | 4/1995 |
| JP | 07269926 A | 10/1995 |
| JP | 07270459 A | 10/1995 |
| JP | 8-285421 A | 11/1996 |
| JP | 8307541 A | 11/1996 |
| JP | 09-298377 A | 11/1997 |
| JP | 10-339500 A | 12/1998 |
| JP | 11164035 A | 6/1999 |
| JP | 11-184570 A | 7/1999 |
| JP | 11219388 A | 8/1999 |
| JP | 11338666 A | 12/1999 |
| JP | 2000092092 A | 3/2000 |
| JP | 2000-112574 A | 4/2000 |
| JP | 2000134606 A | 5/2000 |
| JP | 2000151606 A | 5/2000 |
| JP | 2000209204 A | 7/2000 |
| JP | 2000278773 A | 10/2000 |
| JP | 2000-315883 | 11/2000 |
| JP | 2001024638 A | 1/2001 |
| JP | 2001-260640 A | 9/2001 |
| JP | 2001257496 A | 9/2001 |
| JP | 2002-101973 A | 4/2002 |
| JP | 2002-119339 A | 4/2002 |
| JP | 2010233784 A | 10/2010 |
| JP | 2011161968 A | 8/2011 |
| TW | 0443058 B | 6/2001 |
| TW | 0448349 B | 8/2001 |
| WO | 95/21506 A2 | 8/1995 |
| WO | 96/15615 A1 | 5/1996 |
| WO | 97/30879 A1 | 8/1997 |
| WO | 98/01838 A1 | 1/1998 |
| WO | 9804067 A1 | 1/1998 |
| WO | 98/26541 A1 | 6/1998 |
| WO | 99/01918 A2 | 1/1999 |
| WO | 99/08183 A1 | 2/1999 |
| WO | 9915950 A1 | 4/1999 |
| WO | 99/27456 A1 | 6/1999 |
| WO | 99/45445 A1 | 9/1999 |
| WO | 00/35177 A1 | 6/2000 |
| WO | 00/39724 A2 | 7/2000 |
| WO | 00/54557 A1 | 9/2000 |
| WO | 00/58673 A1 | 10/2000 |
| WO | 00/73866 A1 | 12/2000 |
| WO | 00/79500 A1 | 12/2000 |
| WO | 2000/076158 A1 | 12/2000 |
| WO | 01/01366 A2 | 1/2001 |
| WO | 01/08396 A1 | 2/2001 |
| WO | 01/27763 A1 | 4/2001 |
| WO | 0131849 A1 | 5/2001 |
| WO | 01/57477 A1 | 8/2001 |
| WO | 01/57631 A1 | 8/2001 |
| WO | 01/61665 A2 | 8/2001 |
| WO | 0162060 A1 | 8/2001 |
| WO | 01/69405 A1 | 9/2001 |
| WO | 0169504 A1 | 9/2001 |
| WO | 01/79935 A1 | 10/2001 |
| WO | 01/82028 A2 | 11/2001 |
| WO | 0186217 A1 | 11/2001 |
| WO | 01/93042 A2 | 12/2001 |
| WO | 01/93508 A1 | 12/2001 |
| WO | 01/97907 A2 | 12/2001 |
| WO | 01/99402 A2 | 12/2001 |
| WO | 02/01877 A1 | 1/2002 |
| WO | 02/11391 A2 | 2/2002 |
| WO | 0216854 A1 | 2/2002 |
| WO | 0233980 A2 | 4/2002 |
| WO | 02/37280 A2 | 5/2002 |
| WO | 02/47044 A1 | 6/2002 |
| WO | 02/47369 A1 | 6/2002 |
| WO | 02/48830 A2 | 6/2002 |
| WO | 02/49285 A1 | 6/2002 |
| WO | 02/057925 A2 | 7/2002 |

(56) References Cited

FOREIGN PATENT DOCUMENTS

| WO | 02/065030 A1 | 8/2002 |
|---|---|---|
| WO | 02060124 A2 | 8/2002 |
| WO | 02093093 A1 | 11/2002 |
| WO | 02093403 A1 | 11/2002 |
| WO | 02099683 A1 | 12/2002 |
| WO | 2003005200 A1 | 1/2003 |
| WO | 03/083631 A1 | 10/2003 |
| WO | 2003081406 A1 | 10/2003 |
| WO | 2004049773 A2 | 6/2004 |
| WO | 2005081091 A2 | 9/2005 |
| WO | 20050122664 A1 | 12/2005 |
| WO | 2006/034718 A1 | 4/2006 |
| WO | 2006119248 A2 | 11/2006 |
| WO | 20060124240 A2 | 11/2006 |
| WO | 2007095144 A2 | 8/2007 |
| WO | 2008144375 A2 | 11/2008 |
| WO | 2009/014893 A1 | 1/2009 |
| WO | 2010023619 A1 | 3/2010 |
| WO | 2010068434 A1 | 6/2010 |
| WO | 2011/019615 A1 | 2/2011 |
| WO | 2012037427 A1 | 3/2012 |
| WO | 2012082985 A2 | 6/2012 |
| WO | 2012135038 A1 | 10/2012 |
| WO | 2013/095494 A1 | 6/2013 |

OTHER PUBLICATIONS

Althouse, Turnquist, Bracciano: "Modern Refrigeration and Air Conditioning," 2000, The Goodheart-Willcox Company, Inc., XP002479591, pp. 715-716.
N. Rasmussen, "Calculating Total Cooling Requirements for Data Centers", White Paper #25, pp. 1-8, American Power Conversion, May 20, 2004, published on World Wide Web.
K. Dunlap, "Cooling Audit for Identifying Potential Cooling Problems in Data Centers", White Paper #40, pp. 1-18, American Power Conversion, May 20, 2004, published on World Wide Web.
N. Rasmussen, "Cooling Strategies for Ultra-High Density Racks and Blade Servers", White Paper #46, pp. 1-22, American Power Conversion, Mar. 29, 2005, published on World Wide Web.
Sharma, R.K, Bash, C.E., and Patel, C.D, "Dimensionless Parameters for Evaluation of Thermal Design and Performance of Large-Scale Data Centers." 8th ASME/AIAA Joint Thermophysics and Heat Transfer Conference, Jun. 24-26, 2002. St. Louis, Missouri.
Bash, C.E., Patel, C.D., and Sharma, R.K., "Efficient Thermal Management of Data Centers—Immediate and Long-Term Research Needs" Intl. J. Heat, Ventilating, Air-Conditioning and Refrigeration Research, 2003, pp. 137-152, vol. 9, No. 2.
"Management Strategy for Network Critical Physical Infrastructure", White Paper #100, pp. 110, American Power Conversion, Dec. 15, 2003, published on World Wide Web.
Herrlin, M.K., "Rack Cooling Effectiveness in Data Centers and Telecom Central Offices: The Rack Cooling Index (RCI)," ASHRAE Transaction, 2005, pp. 725-731, vol. 111(2).
N. Rasmussen, "Strategies for Deploying Blade Servers in Existing Data Centers", White Paper #125, pp. 1-14, American Power Conversion, Mar. 29, 2005, published on World Wide Web.
Ashrae, "Thermal Guidelines for Data Processing Environments" 2004, Atlanta: American Society of Heating, Refrigerating, and Air-Conditioning Engineers, Inc., 2004, Atlanta.
Abi-Zadeh, Davar et al., "A Transient Analysis of Environmental Conditions for a Mission Critical Facility after a Failure of Power", Arup Mission Criticial Facilities, Feb. 2001, pp. 1-12.
Dvinsky: "Hot Tips for Using Cooling Software a Little Planning Lets Users Get More from Their Thermal-Simulation Software", Machine Design, Penton Media, Cleveland, OH, vol. 72, No. 4, Feb. 24, 2000.
Pinheiro, Eduardo, "Load Balancing and Unbalancing for Power and Performance in Cluster-Based Systems," Internet Citation, May 1, 2001 URL:http://research.ac.upc.es/pact01/colp/paper04.pdf, retrieved on Nov. 17, 2003.
Le et al., "Operating Behaviour of Single Split Coil Systems Under Modulating and Two-Position Control", Published 2005 by American Society of Heating, Refrigerating and Air-Conditioning Engineers, Inc.
Bash, C. E. et al.: "Balance of Power: Dynamic Thermal Management for Internet Data Centers", IEEE Internet Computing , Jan. 1, 2005, pp. 42-49, vol. 9, No. 1, IEEE Service Center, New York, NY.
Texas Instruments Incorporated, "A True System-on-Chip Solution for 2A GHz IEEE 802.15.4 and ZigBee Applications," CC2530F32, CC2530F64, CC2530F128, CC2530F256, Apr. 2009—Revised Feb. 2011, www.ti.com, pp. 36.
VanGilder, James W. et al., "Caputure index: an airflow-based rack cooling performance metric," 2007, ASHRAE Transactions, vol. 113, pp. 126-136.
Shrivastava S K et al., Optimization of Cluster Cooling Performance for Data Centers, Thermal and Thermomechanical Phenomena in Electronic Systems, May 28, 2008, pp. 1161-1166, 11th Intersociety Conference on, IEEE, Piscataway, NJ.
VanGilder, James W. et al., "Real-Time prediction of rack-cooling performance," 2006, ASHRAE Transactions, vol. 112, pp. 151-162.
Ahmad, Jasim U. et al., "Navier-Stokes simulation of air-conditioning facility of a large modern computer room," Jun. 2005, Proceedings of the 2005 ASME Fluids Engineering Division Summer Meeting and Exhibition, pp. 1-6.
Chandrakant D. Patel, et al., "Thermal Considerations in Cooling Large Scale High Copute Density Data Centers" IEEE 2002, pp. 767-776.
Innovative Research, Inc., http://web.archive.org/web/20051221005029/http://www.inres.com/, Dec. 21, 2005, published on World Wide Web.
APC User's Guide Brochure, "InfraStruXure Manager," Mar. 2004, 181 pgs.
VanGilder et al., "Airflow Uniformity thourhg Perforated Tiles in a Raised-Floor Data Center", White Paper 121, Jul. 17-22, 2005, 10 pages.
Chen et al. "Analysis of the Key Agreement Scheme of ZigBee Standard". E-Business and Information System Security (E-BISS), 2010 2nd International Conference on IEEE, Pscataway, NJ USA. May 22, 2010.
Baronti et al. "Wireless Sensor Networks: A Survey on the State of the Art and the 802.15.4 and ZigBee Standards". Computer Communications, Elsevier Science Publishers B.V. Amsterdam, NL. vol. 30, No. 7. Apr. 8, 2007. pp. 1655-1695.
Rittal, Catalogue 31, front page p.672 and back page, Apr. 2005.
Rittal, <http://www.rittal.com/services_support/downloads/brochures.asp>, download page for catalogue 31.
Ehsan Pakabaznia et al., "Miminizing data center cooling and server power costs", Proceedings of the 14th ACM/IEEE International Symposium on Low Power Electronics and Design, ISLPED '09, Jan. 1, 2009 (Jan. 1, 2009), p. 145, XP55015368, New York, New York, USA, DOI: 10.1145/1594233.1594268, ISBN: 978-1-60-558684-7.
Jeffrey Rambo et al., "Modeling of data center airflow and heat transfer: State of the art and future trends", Distributed and Parallel Databases, Kluwer Academic Publishers, BO, vol. 21, No. 2-3, Jan. 20, 2007 (Jan. 20, 2007), pp. 193-225, XP019499845, ISSN: 1573-7578, DOI:10.1007/S10619-006-7007-3.
Vanessa Lopez et al., "Measurement-based modeling for data centers", Thermal and Thermomechanical Phenomena in Electronic Systems (ITHERM), 2010 12th IEEE Intersociety Conference on, IEEE, Piscataway, NJ, USA, Jun. 2, 2010 (Jun. 2, 2010), pp. 1-8, XP031702357.
Anderson, Donald, "Iterative Procedures for Nonlinear Integral Equations," Journal of the Association for Computing Machinery, vol. 12, No. 4, Oct. 1965, pp. 547-560.
Karki et al., "Techniques for controlling airflow distribution in raised-floor data centers," ASME 2003.
"Case Study, Application of TileFlow to Improve Cooling in a Data Center," Innovative Research, Inc., 2004.
Pakbaznia, E.; Ghasemazar, M.; Pedram, M.:, "Temperature-aware dynamic resource provisioning in a power-optimized datacenter," Design, Automation & Test in Europe Conference & Exhibition (Date), 2010, vol., No., pp. 124-129, Mar. 8-12, 2010.

(56) References Cited

OTHER PUBLICATIONS

Jeonghwan Choi et al., "A CFD-Based Tool for Studying Temperature in Rack-Mounted Servers", IEEE Transactions on Computers, IEEE Service Center, Los Alamitos, CA, US, vol. 57, No. 8, Aug. 1, 2008 (Aug. 1, 2008), pp. 1129-1142, ISSN: 0018-9340, DOI: 10.1109/TC.2008.52.

Shrivastava S.K. et al., "A flow-network model for predicting rack cooling in containment systems", Proceedings of the ASME Interpack Conference—2009: Presented at 2009 ASME Interpack Conference, Jul. 19-23, 2009, San Francisco, California, USA, vol. 2, Jul. 19, 2009 (Jul. 19, 2009), pp. 785-791.

Refai-Ahmed G. et al., "Analysis of flow distribution in power supply using flow network modeling (FNM)", Thermal and Thermomechanical Phenomena in Electronic Systems, 2000, IT HERM 2000, The Seventh Intersociety Conference on May 23-26, 2000, Piscataway, NJ, USA, IEEE, Piscataway, NJ, USA, vol. 1, May 23, 2000 (May 23, 2000), pp. 90-98, ISBN: 978-0-7803-5912-3.

Toulouse M.M. et al., "Exploration of a potential-flow-based compact model of air-flow transport in data centers", Proceedings of the ASME International Mechanical Engineering Congress and Exposition—2009: Presented at 2009 ASME International Mechanical Engineering Congress and Exposition, Nov. 13-19, 2009, Lake Buena Vista, Florida, USA, vol. 13: New Del, vol. 13, Jan. 1, 2009 (Jan. 1, 2009), pp. 41-50, DOI: 10.1115/IMECE2009-10806, ISBN: 978-0-7918-4386-4.

Bejan Convection Heat Transfer, "Free Stream Turbulence," Ch. 8, pp. 282-305.

Verhoff, A., The Two-Dimensional, Turbulent Wall Jet with and without an External Free Stream, Office of Naval Research Department of the Navy Contact Nonr 1858(14) in Co-Operation with Bureau of Naval Weapons, Report No. 626, May 1963.

Healey, C., et al., "Potential-Flow Modeling for Data Center Applications," Proceedings of the ASME 2011 Pacific Rim Technical Conference & Exposition on Packaging and Integration of Electronic and Photonic Systems, IPACK2011-52136, Jul. 6-8, 2011.

David M. Xu et al., Quasi Soft-Switching Partly Decoupled Three-Phase PFC with Approximate Unity Power Factor, 1998, pp. 953-957.

International Search Report from corresponding PCT/US2011/066877 dated Apr. 19, 2012.

VanGilder, Real-Time Data Center Cooling Analysis, APC by Schneider Electric, Billerica, MA USA, Electronics Cooling, Sep. 2011, pp. 14-16.

"Optimizing facility operation in high density data center environments," 2007, Hewlett-Packard Development Company, pp. 1-25.

A. Hinchcliffe: "AutocadCentral.com Free Tutorials—Layers", Jan. 4, 2005, pp. 1-3, XP055187044, Retrieved from the Internet: URL:http://web.archive.org/web/20050104015104/http://www.autocadcentral.com/Tutorials/Lesson%207/lesson7.htm.

Axis Communications, "Axis 200+ and 240 Camera Server: User's Guide", www.axis.com/techsup/cam_servers/cam_240/index.htm, pp. 1-38, Jan. 1999.

Axis communications, "Axis 2400/2401 Administration Manual Version 1.1", www.axis.com/techsup/cam_servers/cam_2400/index.htm, version 1.1.xx, part No. 16741, pp. 1-78, Jul. 1999.

Axis Communications, "Network Camera Developments Enable Live Web Imaging", Axis 2100 white paper, www.axis.com/products/videos/camera/documentation.htm, pp. 1-12, Nov. 1999.

Beaty et al., "High Density Cooling of Data Centers and Telecom Facilities—Part 2," 2005, ASHRAE Transactions, vol. 111, pp. 932-944.

Beitelmal et al., "Thermo-Fluids Provisioning of a High Performance High Density Data Center", Apr. 22, 2006, Springer Science and Business Media, Inc, Distributed and Parallel Databases, 21, pp. 227-238 DOI:1 0.1 007/s10619-005-0413-0.

Duran et al., "Virtual personal computers and the portable network," IEEE Proceedings of Inter. Performance, Computing, and Communications, IPCCC'99, p. 52-56, Feb. 1999.

Enterprise 4000/4500/Stor Rack Kit Installation Instructions, Oct. 1, 2001.

Fossum, E.R. "CMOS image sensors; electronic camera-on-a-chip", IEEE Transactions on Electron Devices, vol. 44, ss. 10, pp. 1689-1698, Oct. 1997.

Gilbert, R. Validation of Computational Fluid Dynamics Based Data Center Cyber-Physical Models. Arizona State University. May 2012. [Retrieved Feb. 21, 2013].[Retrieved from internet: <URL:http://impact.asu.edu/thesis/Robin_thesis.pdf>]. entire document.

Hochhauser, "Netbotz Wallbotx 400 is the next best thing to being there," CMP Media Inc., Network Computing, V. 13, No. 2, p. 1-2, Jan. 2002.

Inlet and Outlet Areas. University of Oregon. unknown. [retrived Feb. 21, 2013].[Retrieved from internet:<URL: pages.uoregon.edu/esbl/es _site/student_ option/explanations folder/inlet_ outlet_ areas.htm> ]. entire document.

Liebert, "DataCool—60 Hz", May 2002, 2 pages.

Liebert, "Foundation—60Hz", May 2002, 9 pages.

Marshall et al.: "Transient CRAC Failure Analysis", retrieved from the Internet: http://coolsimsoftware.com/Portals/0/PDF/WP_106_CRAC_Failure.pdf [retrieved Apr. 25, 2016]; Dec. 31, 2010, pp. 1-7.

Schmidt et al., "Best practices for data center thermal and energy management—review of literature," ASHRAE Transactions, vol. 112, pp. 206-218 [2007].

Sinetica Corp: "Netcom TH. Advanced SNMP Agent with Web Broser Support", Sinetica, UK, www.sinetica.co.uk, Apr. 2000, XP002160505, 2 pp.

Sinetica Corp: "Newsletter, Issue One 99", Sinetica, UK, www.sinetica.co.uk, Feb. 1999, XP002160504, 4 pp.

Sinha et al., "Numerical simulation of two-dimensional room air flow with and without buoyancy", Energy and Buildings, vol. 32, Issue 1, Jun. 2000, pp. 121-129.

Symmetra Brochure, "Server, Network and Telecom Power Soultions," pp. 1-20. = 2001 No Month Available.

Thermodynamics: An Engineering Approach (Fourth Edition) Cengel et al. Published by McGraw Hill (c)2004.

VanGilder et al., "Partially decoupled aisle method for estimating rack-cooling performance in near-real time," 2007, Proceedings of the IPACK2007 ASME InterPACK07, pp. 781-789.

Bemis et al, Data Center Airflow Modeling: Helps Facilities Planners Make Informed Decisions. Applied Math Modeling Inc. 2009 [retrieved on Apr. 19, 2012). Retrieved from the Internet: <URL: http:l/www.coolsimsoftware.com/wwwrooULinkCiick.aspx?fileticket=r1 SqFUDtRTk%3D&tabid=189> entire document.

Neil Rasmussen, "Air Distribution Architecture Options for Mission Critical Facilities," White Paper #55, Revision 1, 2003 American Power Conversion, Rev 2003-0, pp. 1-13.

Neil Rasmussen, "Avoidable Mistakes that Compromise Cooling Performance in Data Centers and Network Rooms," White Paper #49, 2003 American Power Conversion, Rev 2003-0, pp. 1-15.

Neil Rasmussen, "Cooling Options for Rack Equipment with Side-to-Side Airflow," White Paper #50, 2004 American Power Conversion, Rev 2004-0, pp. 1-14.

"Essential Cooling System Requirements for Next Generation Data Centers," White Paper #5, Revision 3, 2003 American Power Conversion, Rev 2002-3, pp. 1-10.

Tony Evans, "Fundamental Principles of Air Conditioners for Information Technology," White Paper #57, Revision 1, 2004 American Power Conversion, Rev 2004-1, pp. 1-9.

Neil Rasmussen, "Guidelines for Specification of Data Center Power Density," White Paper #120, 2005 American Power Conversion, Rev 2005-0, pp. 1-21.

"How and Why Mission-Critical Cooling Systems Differ From Common Air Conditions," White Paper #56, Revision 2, 2003 American Power Conversion, Rev 2003-2, pp. 1-13.

Tony Evans, "Humidification Strategies for Data Centers and Network Rooms," White Paper 58, 2004 American Power Conversion, Rev 2004-0, pp. 1-13.

Tony Evans, "The Different Types of Air Conditioning Equipment for IT Environments," White Paper #59, 2004 American Power Conversion, Rev 2004-0, pp. 1-21.

(56) References Cited

OTHER PUBLICATIONS

Rittal Catalogue, Aug. 2005, p. 115 and p. 140.
Australian Patent Examination Report No. 1 from corresponding Australian Patent Application No. 2011384046 dated May 1, 2017.
Jack P. Holman: "Chapter 3 Steady-State Conduction" in: "Heat Transfer", 2002, McGraw Hill, XP055273397, pp. 71-130.
Lennox, Cubic Feet Per Minute (CFM), 2017, Lennox, pp. 1-2.
Vanessa Lopez et al: "Heat transfer modeling in data centers", International Journal of Heat and Mass Transfer, vo 1 . 54, No. 25, Sep. 15, 2011 (Sep. 15, 2011), pp. 5306-5318, XP028298268, ISSN: 0017-9310, DOI: 10.1016/J.IJHEATMASSTRANSFER.2011.08. 012 [retrieved on Aug. 10, 2011].

* cited by examiner

Power Feeds    Generator Start time [ 60 ] sec.

|  | UPS | Generator | UPS Runtime (min.) |
|---|---|---|---|
| IT Equipment |  | ✓ | 1 |
| Cooler Fans | ✓ | ✓ | 10 |
| Chilled Water Pumps | ✓ | ✓ | 10 |
| Chillers |  | ✓ | N/A |

FIG. 6

ANALYSIS OF EFFECT OF TRANSIENT EVENTS ON TEMPERATURE IN A DATA CENTER

This application is a U.S. National Stage Application under 35 U.S.C. § 371 from International Application No. PCT/US2011/066877, filed Dec. 22, 2011, which is hereby incorporated by reference in its entirety for all purposes.

BACKGROUND

Field of the Invention

At least one embodiment in accordance with the present invention relates generally to systems and methods for data center management and design, and more specifically, to systems and methods for predicting cooling performance within a data center upon the occurrence of one or more transient events related to cooling suppliers or cooling consumers.

Discussion of Related Art

In response to the increasing demands of information-based economies, information technology networks continue to proliferate across the globe. One manifestation of this growth is the centralized network data center. A centralized network data center typically consists of various information technology equipment, collocated in a structure that provides network connectivity, electrical power and cooling capacity. Often the equipment is housed in specialized enclosures termed "racks" which integrate these connectivity, power and cooling elements. In some data center configurations, these rows are organized into hot and cold aisles to decrease the cost associated with cooling the information technology equipment. A raised floor having an air plenum beneath the floor is typically used for providing cooling air to the racks. Cool air is distributed from the air plenum to the racks through perforated tiles having open areas.

Various processes and software applications, such as the data center management systems available from American Power Conversion (APC) Corporation of West Kingston, R.I., have been developed to aid data center personnel in designing and maintaining efficient and effective data center configurations. These tools often guide data center personnel through activities such as designing the data center structure, positioning equipment within the data center prior to installation and repositioning equipment after construction and installation are complete. Thus, conventional tool sets provide data center personnel with a standardized and predictable design methodology.

SUMMARY OF THE INVENTION

A first aspect of the invention is directed to a computer-implemented method for evaluating cooling performance of equipment in a data center, the equipment including a plurality of equipment racks and at least one cooling provider. The method includes receiving data related to types of equipment and an arrangement of equipment in the data center, determining first parameters related to airflow and parameters related to temperature in at least a portion of the data center at a first period in time, receiving a description of a transient event affecting one of airflow and temperature in the at least a portion of the data center and occurring at a second time, subsequent to the first time period, breaking a second time period subsequent to the second time into a plurality of time intervals, determining second parameters related to airflow in the at least a portion of the data center during one of the plurality of time intervals, determining the parameters related to temperature in the portion of the data center at each of the plurality of time intervals based on the second parameters related to airflow, and storing, on a storage device, a representation of the parameters related to temperature in the portion of the data center during the second time period.

In accordance with some embodiments, receiving the description of the transient event comprises receiving a description of a period of time over which the transient event affects one of the airflow and the temperature in the at least a portion of the data center.

In accordance with some embodiments, the method further comprises determining a temperature of inlet air of each of the plurality of equipment racks during each of the plurality of time intervals of the second time period.

In accordance with some embodiments, the method further comprises providing an indication of whether any of the plurality of equipment racks achieves an unacceptable temperature during a user selectable time period subsequent to the second time.

In accordance with some embodiments, the method further comprises providing an indication of a time period subsequent to the second time during which an equipment rack of the plurality of equipment racks receives inlet air a temperature below a user defined acceptable temperature.

In accordance with some embodiments, one of the first parameters related to airflow and the second parameters related to airflow are determined using one of a CFD process and a potential flow model analysis.

In accordance with some embodiments, determining the parameters related to temperature includes computationally dividing the at least a portion of the data center into a plurality of cells and for each cell of the plurality of cells determining a temperature of the cell by calculating heat transfer into the cell from any adjacent cells.

In accordance with some embodiments, a temperature of one of an exhaust of each of the plurality of equipment racks and a supply of the at least one cooling provider during each of the plurality of time intervals of the second time period is calculated using an internal thermal mass method.

In accordance with some embodiments, the method further comprises providing an indication of a change in temperature of at least one the inlet air and an exhaust of the plurality of equipment racks during the second time period.

In accordance with some embodiments, one of the first parameters related to airflow and the second parameters related to airflow in the portion of the data center are determined using a computational method independent of a different computational method used to determine the parameters related to temperature in the portion of the data center.

Another aspect of the invention is directed to a system for evaluating equipment in a data center, the equipment including a plurality of equipment racks, and at least one cooling provider. The system includes an interface and a controller coupled to the interface. The controller is configured to receive data related to types of equipment and an arrangement of equipment in the data center, determine first parameters related to airflow and parameters related to temperature in at least a portion of the data center at a first period in time, receive a description of a transient event affecting one of airflow and temperature in the at least a portion of the data center and occurring at a second time, subsequent to the first time period, break a second time period subsequent to the second time into a plurality of time intervals, determine second parameters related to airflow in the at least a portion of the data center during one of the plurality of time intervals, determine the parameters related to temperature in the portion of the data center at each of the plurality of time intervals based on the second parameters related to airflow, and store, on a storage device, a representation of the parameters related to temperature in the portion of the data center during the second time period.

In accordance with some embodiments, the controller is further configured to determine a temperature of inlet air of each of the plurality of equipment racks during each of the plurality of time intervals of the second time period.

In accordance with some embodiments, the controller is further configured to determine the temperature of the inlet air of each of the plurality of equipment racks during each of the plurality of time intervals of the second time period using an internal thermal mass method.

In accordance with some embodiments, the controller is configured to determine one of the first parameters related to airflow and the second parameters related to airflow in the portion of the data center using an algebraic model and to determine the parameters related to temperature in the portion of the data center using a Temperature Model.

In accordance with some embodiments, the controller is configured to determine one of the first parameters related to airflow and the second parameters related to airflow using one of a CFD process and a potential flow model analysis.

Another aspect of the invention is directed to a computer readable medium having stored thereon sequences of instruction including instructions that will cause a processor to receive data related to types of equipment and an arrangement of equipment in the data center, determine first parameters related to airflow and parameters related to temperature in at least a portion of the data center at a first period in time, receive a description of a transient event affecting one of airflow and temperature in the at least a portion of the data center and occurring at a second time, subsequent to the first time period, break a second time period subsequent to the second time into a plurality of time intervals, determine second parameters related to airflow in the at least a portion of the data center during one of the plurality of time intervals, determine the parameters related to temperature in the portion of the data center at each of the plurality of time intervals based on the second parameters related to airflow, and store, on a storage device, a representation of the parameters related to temperature in the portion of the data center during the second time period.

In accordance with some embodiments, the sequences of instructions further include instructions that will cause the processor to determine a temperature of air received by an inlet of each of the plurality of equipment racks during each of the plurality of time intervals of the second time period.

In accordance with some embodiments, the sequences of instructions further include instructions that will cause the processor to provide an indication of whether any of the plurality of equipment racks achieves an unacceptable temperature during a user selectable time period subsequent to the second time.

In accordance with some embodiments, the sequences of instructions further include instructions that will cause the processor to provide an indication a cooling runtime subsequent to the second time of the plurality of equipment racks.

In accordance with some embodiments, the sequences of instructions further include instructions that will cause the processor to provide an indication of a change in temperature of at least one of inlet air and an exhaust of the plurality of equipment racks during the second time period.

In accordance with some embodiments, the sequences of instructions further include instructions that will cause the processor to determine the temperature of inlet air of each of the plurality of equipment racks during each of the plurality of time intervals of the second time period using an internal thermal mass method.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 6 is an interface of a software tool in accordance with one example;

DETAILED DESCRIPTION

Figure 1:
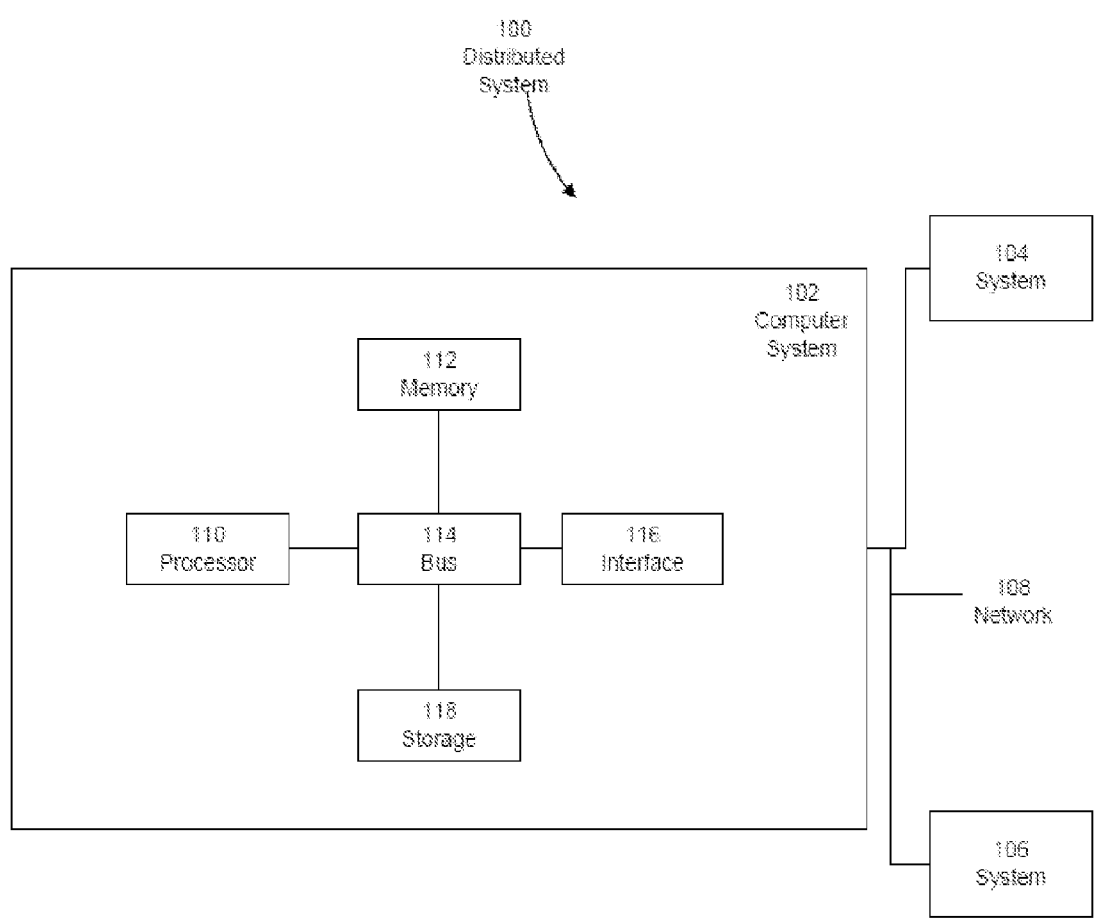
FIG. 1 is a block diagram of one example of a computer system with which various aspects in accord with the present invention may be implemented.

At least some embodiments in accordance with the present invention relate to systems and processes through which a user may design and analyze data center configurations. These systems and processes may facilitate this design and analysis activity by allowing the user to create models of data center configurations from which performance metrics may be determined. Both the systems and the user may employ these performance metrics to determine alternative data center configurations that meet various design objectives. Further, in at least one embodiment, a system provides modeling and prediction of airflow for a proposed layout of a data center equipment and also provides prediction of cooling performance for an installed or planned data center which incorporates the effect of transient events such as enablement or a failure of a portion of a cooling system or enablement or disablement of a heat producing piece of equipment.

As described in U.S. Pat. No. 7,991,592, titled "System and Method for Evaluating Equipment Rack Cooling," issued Aug. 2, 2011 (referred to herein as "the '592 patent"), in U.S. patent application Ser. No. 11/342,300, titled "Methods and Systems for Managing Facility Power and Cooling," filed Jan. 27, 2006 (referred to herein as "the '300 application"), in U.S. patent application Ser. No. 12/884,832, titled "System and Method for Predicting Perforated Tile Airflow in a Data Center," filed Sep. 17, 2010 (referred to herein as "the '832 Application"), and U.S. patent application Ser. No. 12/795,862, titled "System and Method for Predicting Temperature Values in a Data Center," filed Jun. 8, 2010 (referred to herein as "the '862 application"), each of which are assigned to the assignee of the present application, and each of which is hereby incorporated herein by reference in its entirety for all purposes, typical equipment racks in modern data centers draw cooling air into the front of the rack and exhaust air out of the rear of the rack. The equipment racks and in-row coolers are typically arranged in rows in an alternating front/back arrangement creating alternating hot and cool aisles in a data center with the front of each row of racks facing the cool aisle and the rear of each row of racks facing the hot aisle. Adjacent rows of equipment racks separated by a cool aisle may be referred to as a cool aisle cluster, and adjacent rows of equipment racks separated by a hot aisle may be referred to as a hot aisle cluster. Further, single rows of equipment may also be considered to form both a cold and a hot aisle cluster by themselves. A row of equipment racks may be part of multiple hot aisle clusters and multiple cool aisle clusters. In descriptions and claims herein, equipment in racks, the racks themselves, or other heat producing equipment may be referred to as cooling consumers, and in-row cooling units, computer room air conditioners (CRACs), computer room air handlers (CRAHs), and/or other forms of cooling equipment may be referred to as cooling providers. In the referenced applications, tools are provided for analyzing the cooling performance of a cluster of racks in a data center. In these tools, multiple analyses may be performed on different layouts to attempt to optimize the cooling performance of the data center.

In at least one embodiment, a method is provided for performing, in real-time, an analysis on a layout of equipment in a data center for providing predictions of air temperatures within and at inlets and exhausts of equipments racks and cooling providers and the flow rate and temperature of air at various locations in a data center. The air temperature predictions may incorporate predictions of the change in airflow rate and/or temperature over time upon the occurrence of a change in the performance of at least part of a cooling system and/or a cooling consumer. Aspects disclosed herein in accordance with the present embodiments, are not limited in their application to the details of construction and the arrangement of components set forth in the following description or illustrated in the drawings. These aspects are capable of assuming other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

For example, according to one embodiment of the present invention, a computer system is configured to perform any of the functions described herein, including but not limited to, configuring, modeling, and presenting information regarding specific data center configurations. Further, computer systems in embodiments may be used to automatically measure environmental parameters in a data center, and control equipment, such as chillers or coolers to optimize performance. Moreover, the systems described herein may be configured to include or exclude any of the functions discussed herein. Thus, the embodiments are not limited to a specific function or set of functions. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items.

Computer System

Various aspects and functions described herein in accordance with the present embodiments may be implemented as hardware or software on one or more computer systems. There are many examples of computer systems currently in use. These examples include, among others, network appliances, personal computers, workstations, mainframes, networked clients, servers, media servers, application servers, database servers, and web servers. Other examples of computer systems may include mobile computing devices, such as cellular phones and personal digital assistants, and network equipment, such as load balancers, routers and switches. Further, aspects in accordance with the present embodiments may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Thus, the embodiments are not limited to executing on any particular system or group of systems. Further, aspects may be implemented in software, hardware or firmware, or any combination thereof. Thus, aspects in accordance with the present embodiments may be implemented within methods, acts, systems, system elements and components using a variety of hardware and software configurations, and the embodiments are not limited to any particular distributed architecture, network, or communication protocol.

FIG. 1 shows a block diagram of a distributed computer system 100, in which various aspects and functions in accord with the present embodiments may be practiced. Distributed computer system 100 may include one more computer systems. For example, as illustrated, distributed computer system 100 includes computer systems 102, 104, and 106. As shown, computer systems 102, 104, and 106 are interconnected by, and may exchange data through, communication network 108. Network 108 may include any communication network through which computer systems may exchange data. To exchange data using network 108, computer systems 102, 104, and 106 and network 108 may use various methods, protocols and standards, including, among others, token ring, Ethernet, wireless Ethernet, Bluetooth, TCP/IP, UDP, Http, FTP, SNMP, SMS, MMS, SS7, Json, Soap, and Corba. To ensure data transfer is secure, computer systems 102, 104, and 106 may transmit data via network 108 using a variety of security measures including TLS, SSL or VPN among other security techniques. While distributed computer system 100 illustrates three networked computer systems, distributed computer system 100 may include any number of computer systems and computing devices, networked using any medium and communication protocol.

Various aspects and functions in accordance with the present embodiments may be implemented as specialized hardware or software executing in one or more computer systems including computer system 102 shown in FIG. 1. As depicted, computer system 102 includes processor 110, memory 112, bus 114, interface 116, and storage 118. Processor 110 may perform a series of instructions that result in manipulated data. Processor 110 may be a commercially available processor such as an Intel Pentium, Motorola PowerPC, SGI MIPS, Sun UltraSPARC, or Hewlett-Packard PA-RISC processor, but may be any type of processor, multi-processor, microprocessor or controller as many other processors and controllers are available. Processor 110 is connected to other system elements, including one or more memory devices 112, by bus 114.

Memory 112 may be used for storing programs and data during operation of computer system 102. Thus, memory 112 may be a relatively high performance, volatile, random access memory such as a dynamic random access memory (DRAM) or static memory (SRAM). However, memory 112 may include any device for storing data, such as a disk drive or other non-volatile, non-transitory, storage device. Various embodiments in accordance with the present invention may organize memory 112 into particularized and, in some cases, unique structures to perform the aspects and functions disclosed herein.

Components of computer system 102 may be coupled by an interconnection element such as bus 114. Bus 114 may include one or more physical busses, for example, busses between components that are integrated within a same machine, but may include any communication coupling between system elements including specialized or standard computing bus technologies such as IDE, SCSI, PCI, and InfiniBand. Thus, bus 114 enables communications, for example, data and instructions, to be exchanged between system components of computer system 102.

Computer system 102 also includes one or more interface devices 116 such as input devices, output devices, and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow computer system 102 to exchange information and communicate with external entities, such as users and other systems.

Storage system 118 may include a computer readable and writeable, nonvolatile, non-transitory, storage medium in which instructions are stored that define a program to be executed by the processor. Storage system 118 also may include information that is recorded, on or in, the medium, and this information may be processed by the program. More specifically, the information may be stored in one or more data structures specifically configured to conserve storage space or increase data exchange performance. The instructions may be persistently stored as encoded signals, and the instructions may cause a processor to perform any of the functions described herein. The medium may, for example, be optical disk, magnetic disk, or flash memory, among others. In operation, the processor or some other controller may cause data to be read from the nonvolatile recording medium into another memory, such as memory 112, that allows for faster access to the information by the processor than does the storage medium included in storage system 118. The memory may be located in storage system 118 or in memory 112, however, processor 110 may manipulate the data within the memory 112, and then may copy the data to the medium associated with storage system 118 after processing is completed. A variety of components may manage data movement between the medium and integrated circuit memory element and the presently described embodiments are not limited thereto. Further, the embodiments are not limited to a particular memory system or data storage system.

Although computer system 102 is shown by way of example as one type of computer system upon which various aspects and functions in accordance with the present embodiments may be practiced, any aspects of the presently disclosed embodiments are not limited to being implemented on the computer system as shown in FIG. 1. Various aspects and functions in accord with the presently disclosed embodiments may be practiced on one or more computers having a different architectures or components than that shown in FIG. 1. For instance, computer system 102 may include specially-programmed, special-purpose hardware, such as for example, an application-specific integrated circuit (ASIC) tailored to perform a particular operation disclosed herein. While another embodiment may perform the same function using several general-purpose computing devices running MAC OS System X with Motorola PowerPC processors and several specialized computing devices running proprietary hardware and operating systems.

Computer system 102 may be a computer system including an operating system that manages at least a portion of the hardware elements included in computer system 102. Usually, a processor or controller, such as processor 110, executes an operating system which may be, for example, a Windows-based operating system such as Windows NT, Windows 2000 (Windows ME), Windows XP, or Windows Vista operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating system available from various sources. Many other operating systems may be used, and embodiments are not limited to any particular implementation.

The processor and operating system together define a computer platform for which application programs in high-level programming languages may be written. These component applications may be executable, intermediate, for example, C–, bytecode or interpreted code which communicates over a communication network, for example, the Internet, using a communication protocol, for example, TCP/IP. Similarly, aspects in accord with the presently disclosed embodiments may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions in accordance with the presently disclosed embodiments may be implemented in a non-programmed environment, for example, documents created in HTML, XML, or other format that, when viewed in a window of a browser program, render aspects of a graphical-user interface or perform other functions. Further, various embodiments in accord with the present invention may be implemented as programmed or non-programmed elements, or any combination thereof. For example, a web page may be implemented using HTML while a data object called from within the web page may be written in C++. Thus, the presently disclosed embodiments are not limited to a specific programming language and any suitable programming language could also be used.

A computer system included within an embodiment may perform additional functions outside the scope of the presently disclosed embodiments. For instance, aspects of the system may be implemented using an existing commercial product, such as, for example, Database Management Systems such as SQL Server available from Microsoft of Seattle Wash., Oracle Database from Oracle of Redwood Shores, Calif., and MySQL from MySQL AB, a subsidiary of Oracle or integration software such as Web Sphere middleware from IBM of Armonk, N.Y. However, a computer system running, for example, SQL Server may be able to support both aspects in accord with the presently disclosed embodiments and databases for sundry applications.

Example System Architecture

Figure 2:
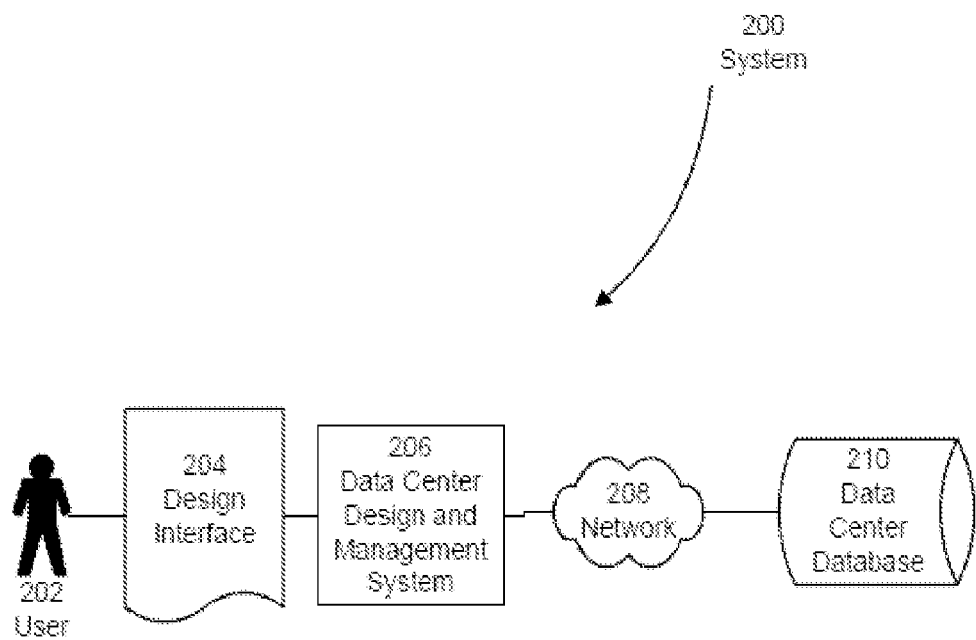
FIG. 2 a schematic of one example of a distributed system including a data center management system.

FIG. 2 presents a context diagram including physical and logical elements of distributed system 200. As shown, distributed system 200 is specially configured in accordance with the presently disclosed embodiments. The system structure and content recited with regard to FIG. 2 is for exemplary purposes only and is not intended to limit the embodiments to the specific structure shown in FIG. 2. As will be apparent to one of ordinary skill in the art, many variant system structures can be architected without deviating from the scope of the presently disclosed embodiments. The particular arrangement presented in FIG. 2 was chosen to promote clarity.

Information may flow between the elements, components, and subsystems depicted in FIG. 2 using any technique. Such techniques include, for example, passing the information over the network via TCP/IP, passing the information between modules in memory and passing the information by writing to a file, database, or some other non-volatile storage device. Other techniques and protocols may be used without departing from the scope of the presently disclosed embodiments.

Referring to FIG. 2, system 200 includes user 202, interface 204, data center design and management system 206, communications network 208, and data center database 210. System 200 may allow user 202, such as a data center architect or other data center personnel, to interact with interface 204 to create or modify a model of one or more data center configurations. According to one embodiment, interface 204 may include aspects of the floor editor and the rack editor as disclosed in Patent Cooperation Treaty Application No. PCT/US08/63675, titled "Methods and Systems for Managing Facility Power and Cooling," filed on May 15, 2008, which is incorporated herein by reference in its entirety and is hereinafter referred to as PCT/US08/63675. In other embodiments, interface 204 may be implemented with specialized facilities that enable user 202 to design, in a drag and drop fashion, a model that includes a representation of the physical layout of a data center or any subset thereof. This layout may include representations of data center structural components as well as data center equipment. The features of interface 204, as may be found in various embodiments in accordance with the present invention, are discussed further below. In at least one embodiment, information regarding a data center is entered into system 200 through the interface, and assessments and recommendations for the data center are provided to the user. Further, in at least one embodiment, optimization processes may be performed to optimize cooling performance and energy usage of the data center.

As shown in FIG. 2, data center design and management system 206 presents data design interface 204 to user 202. According to one embodiment, data center design and management system 206 may include the data center design and management system as disclosed in PCT/US08/63675. In this embodiment, design interface 204 may incorporate functionality of the input module, the display module and the builder module included in PCT/US08/63675 and may use the database module to store and retrieve data.

As illustrated, data center design and management system 206 may exchange information with data center database 210 via network 208. This information may include any information needed to support the features and functions of data center design and management system 206. For example, in one embodiment, data center database 210 may include at least some portion of the data stored in the data center equipment database described in PCT/US08/63675. In another embodiment, this information may include any information needed to support interface 204, such as, among other data, the physical layout of one or more data center model configurations, the production and distribution characteristics of the cooling providers included in the model configurations, the consumption characteristics of the cooling consumers in the model configurations, and a listing of equipment racks and cooling providers to be included in a cluster.

In one embodiment, data center database 210 may store types of cooling providers, the amount of cool air provided by each type of cooling provider, and a temperature of cool air provided by the cooling provider. Thus, for example, data center database 210 includes records of a particular type of CRAC unit that is rated to deliver airflow at the rate of 5,600 cubic feet per minute (cfm) at a temperature of 68 degrees Fahrenheit. In addition, the data center database 210 may store one or more cooling metrics, such as inlet and outlet temperatures of the CRACs and inlet and exhaust temperatures of one or more equipment racks. The temperatures may be periodically measured and input into the system, or in other embodiments, the temperatures may be continuously monitored using devices coupled to the system 200.

Data center database 210 may take the form of any logical construction capable of storing information on a computer readable medium including, among other structures, flat files, indexed files, hierarchical databases, relational databases or object oriented databases. The data may be modeled using unique and foreign key relationships and indexes. The unique and foreign key relationships and indexes may be established between the various fields and tables to ensure both data integrity and data interchange performance.

The computer systems shown in FIG. 2, which include data center design and management system 206, network 208 and data center equipment database 210, each may include one or more computer systems. As discussed above with regard to FIG. 1, computer systems may have one or more processors or controllers, memory and interface devices. The particular configuration of system 200 depicted in FIG. 2 is used for illustration purposes only and embodiments of the invention may be practiced in other contexts. Thus, embodiments of the invention are not limited to a specific number of users or systems.

Data Center Airflow and Temperature Prediction Tool

Aspects and embodiments of a Potential Flow Model (PFM) to predict airflow patterns, pressures, air temperatures, and capture indices for data center applications was described in U.S. patent application Ser. No. 12/970,605, titled "System and Methods for Rack Cooling Analysis," filed Dec. 16, 2010 (referred to herein as "the '605 application"), which is assigned to the assignee of the present application, and which is hereby incorporated herein by reference in its entirety for all purposes. In some data center configurations incorporating equipment racks and coolers, the ability to predict how temperatures vary over time in a data center may be important when considering scenarios such as the loss of power. For example, a data center operator may like to know how long it takes each rack in a data center to reach some maximum acceptable temperature subject to a specific cooling-failure event.

One method for predicting the transient cooling performance of a data center includes a model which assumes that all the air in the data center is at a well-mixed, average temperature. Another method includes performing a full Computational Fluid Dynamics (CFD) analysis on the data center for a time period before, including, and after a specific transient event related to a cooling consumer and/or provider. The former method can be too simplistic and may cause the user to miss important local details or unnecessarily overdesign the cooling infrastructure. CFD can, in theory, provide a desired level of detail but it is typically extremely slow, expensive, and doesn't always converge to a consistent result.

Aspects and embodiments of the present invention provide a method by which localized or object-level transient predictions can be made without the need for a full CFD analysis. In some embodiments the airflow and temperature predictions may be computationally separated so that only a limited number of steady-state airflow patterns are calculated and transient calculations are performed primarily for temperatures. A variety of techniques can be used for computing airflows and temperatures, one combination of which is to use algebraic models for airflow prediction and then a temperature model which focuses on the primary airflow streams of interest in the data center—those associated with the inlet and outlet of each rack and cooler. Aspects and embodiments of the invention also include a novel method for accounting for the "internal" thermal mass of objects like racks and coolers which is more computationally efficient and physically realistic than some "external" heat transfer models presently employed. Methods to visualize results by coloring or otherwise visually differentiating representations of racks by "cooling runtime" or by temperature—which may include a slider bar or other adjustment mechanism for selecting a particular time—are also presented.

In the discussion and examples which follow, the term "cooler" is used generically to mean all types of cooling units including chilled-water and refrigerant-based equipment such as row-based coolers, CRACs, and CRAHs. Additionally, aspects and embodiments of the invention are described with the aid of simple two-dimensional (2D) examples and example equation formulations for specific scenarios. Aspects and embodiments of the invention can be extended to more general data center layouts and three-dimensional (3D) applications without loss of generality.

General Airflow and Temperature Calculation Method

In copending Patent Cooperation Treaty Application No. PCT/US11/66776, titled "System and Method for Prediction of Temperature Values in an Electronics System," filed Dec. 22, 2011, which is herein incorporate by reference in its entirety for all purposes, a method is presented for coupling a Potential Flow Model (PFM) fluid-flow analysis with a solid-temperature-conduction analysis. While this approach can be used for transient data center cooling predictions and is, indeed, a subset of some embodiments of the present invention, some aspects and embodiments of the present invention cover a broader, general approach which may be employed utilizing several alternative techniques for computing airflow and temperatures. Further, aspects and embodiments of the present invention include several novel aspects unique to data center transient applications.

Figure 3:
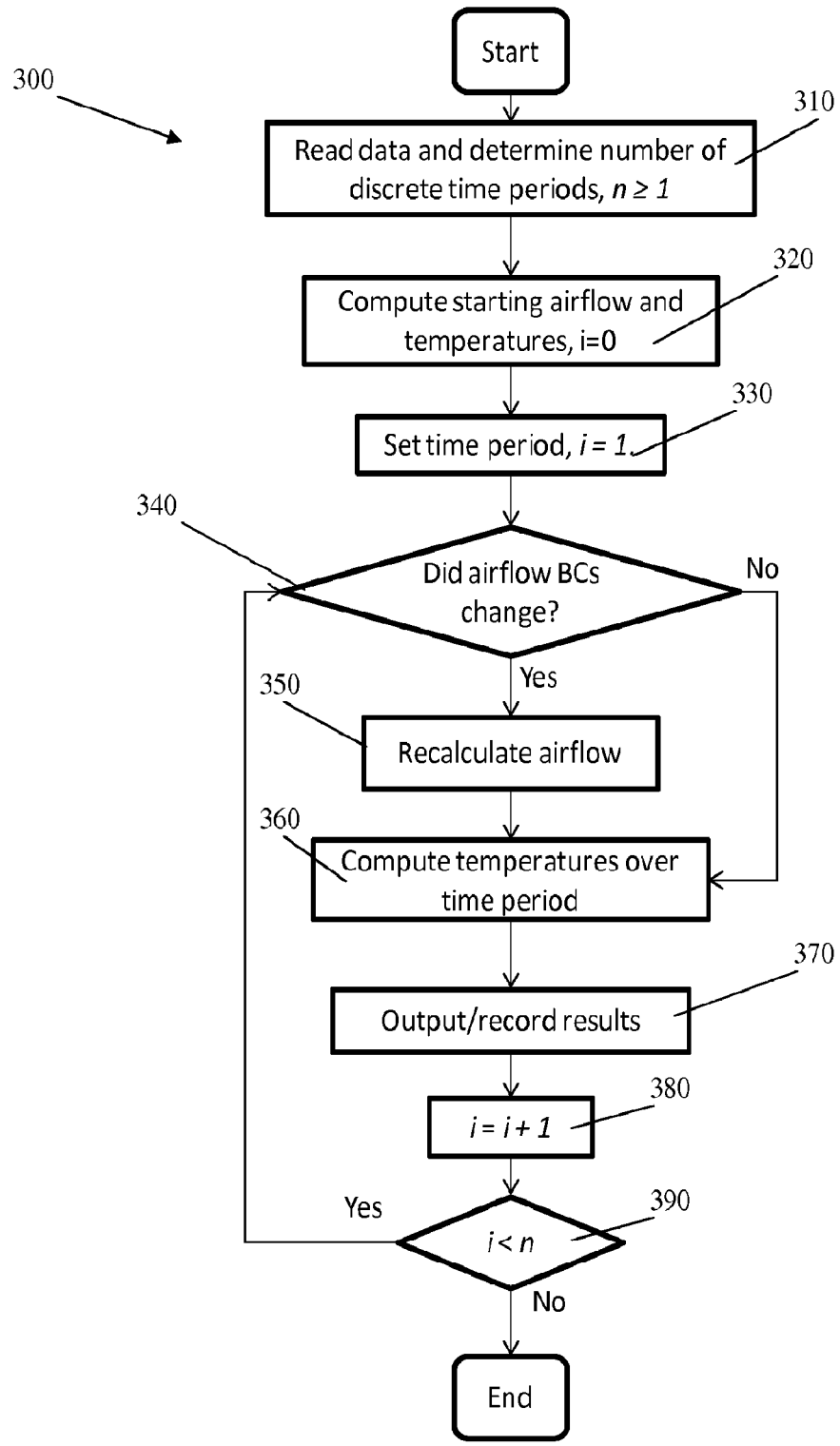
FIG. 3 is a flowchart of a process in accordance with one example.

The general solution technique of various embodiments of a method in accordance with the present invention is shown in FIG. 3, indicated generally at 300. At act 310, geometric, airflow, and thermal data for the facility are acquired and, based on user-specified transient events (e.g., cooler fans being turned off or a rack suddenly dissipating more heat), the time period to be analyzed is determined and broken down into a number of discrete periods between events. Next, at act 320, airflow patterns and temperatures are determined for the starting conditions (e.g., steady-state conditions before a power failure at t=0). Then, the airflow patterns and temperatures are computed for each time period to be analyzed as required (acts 340-390). The airflow patterns may be updated each time there is a change of airflow boundary conditions, e.g., a cooler or rack is turned "on" or "off" while temperatures may be computed continuously over all time periods until the end of the overall analysis period. The airflow patterns may be assumed to maintain a steady state between the occurrence of transient events.

Airflow Pattern Predictions

Airflow patterns may be determined from algebraic models, PFM, CFD, or other techniques as discussed further below. In some aspects and embodiments, either the "fundamental airflows" or the "full flow field" is determined.

Fundamental Airflows

The fundamental airflows are the airflow streams entering and exiting each rack and cooler consistent with the definitions of $f_{ij}$ and $g_{ij}$ discussed in the '862 application. These definitions are reviewed here for completeness. $f_{ij}$ is the fraction of airflow from rack i which is captured by cooling source j and, similarly, $g_{ij}$ is the fraction of rack i's inlet airflow which originated from cooling source j. Together, $f_{ij}$ and $g_{ij}$ may characterize the airflow patterns of greatest importance to the cooling performance of the facility.

Although, $f_{ij}$ and $g_{ij}$ may characterize data center airflow sufficiently by themselves for various aspects and embodiments of the present invention, they may also be used as the building blocks for determining Hot-Aisle Capture Indices (HACIs) and Cold-Aisle Capture Indices (CACIs):

$$HACI_i = \sum_{j=1}^{N} f_{ij} \quad (1)$$

$$CACI_i = \sum_{j=1}^{N} g_{ij} \quad (2)$$

where N is the number of cooling sources. In the HACI calculation, N may include all local cooling extracts (cooler returns, local exhaust grilles, etc.) and, in the CACI calculation, N may include all local cooling supplies.

In summary, $f_{ij}$ and $g_{ij}$ are the fundamental building blocks of HACI and CACI, respectively, and they may completely characterize the fundamental airflow details with which a data center designer or operator should be concerned. During a power failure or other event in which airflow boundary conditions change, and $g_{ij}$ may be recalculated. An example of such an event is when some or all coolers are temporarily turned off.

Full Flow Field

The traditional approach to predicting data center airflow is to use CFD to determine airflow velocities at essentially all locations in the data center. This is an example of the Full Flow Field technique. This technique may provide greater solution resolution and possibly greater accuracy than the Fundamental Airflows technique. The PFM approach is another example of a Full Flow Field technique.

Algebraic Model

As discussed in the '592 patent and the '862 application, algebraic models have been developed to predict both cold and hot-aisle Capture Indexes (CIs) for racks in various configurations. An advantage of the algebraic calculators is that calculations are essentially instantaneous and they are guaranteed to produce a result that, at least, trends in the right direction. The $f_{ij}$ and $g_{ij}$ fundamental-airflow building blocks can be extracted directly from the algebraic calculators and, for various aspects and embodiments of the present transient-temperature-prediction application, Capture Indices may not be explicitly required.

Algebraic models have been developed for essentially all practical groupings of equipment found in a data center so that, with proper recognition of groups and multiple applications of the calculators, all $f_{ij}$s and $g_{ij}$s can be determined.

Potential Flow Model (PFM)

Airflow patterns can also be determined from a PFM analysis as described in the '605 application. PFM analysis may provide more local detail than algebraic models and may work reasonably well for any general application whereas algebraic models may work best for data centers that can be broken down into well-defined equipment clusters bounding common cold or hot aisles. PFM can be solved quickly (perhaps a few seconds for each airflow pattern update) and always converges to a result. PFM analysis can be used as a flow-only model to compute $f_{ij}$ and $g_{ij}$ values to be used subsequently for the air temperature calculations or air temperatures may be computed directly in the PFM analysis. In the latter case, one temperature is predicted for every computational grid cell, providing additional resolution.

Computational Fluid Dynamics (CFD) Model

CFD in the context of various aspects and embodiments of the present invention may mean using CFD to solve only the required number of discrete airflow patterns over the course of the transient analysis—not using CFD to solve the full transient problem in which the evolution of airflow patterns is rigorously updated at each time step. The latter may be much too slow (perhaps days of computation time) for practical applications. The former approach may still be much slower (perhaps hours) than PFM but offers current CFD practitioners (who may not have access to the algebraic or PFM tools) a way to perform an analysis which would otherwise be impossible. Furthermore, CFD may offer a high degree of prediction accuracy. As with PFM, CFD can be used as a flow-only model to compute $f_{ij}$ and $g_{ij}$ values to be used subsequently for air temperature calculations or air temperatures may be computed directly in the CFD analysis. The former approach may further reduce the solution time.

Air Temperature Predictions

Temperature Model

Once airflow patterns are characterized by $f_{ij}$s and $g_{ij}$s, it is possible to estimate all of the temperatures of interest (rack and cooler inlet and outlet temperatures plus one ambient temperature), as discussed in the '862 application. This process will be referred to here as the "Temperature Model." A basic assumption in this model is that there exists one well-mixed temperature for the airflow stream entering and exiting each rack and cooler. The airflow from each local cooler supply to each rack inlet is tracked as is the airflow from each rack exhaust to each local cooler return. Other airflow interactions are assumed to take place with the surrounding well-mixed ambient environment of the data center. Rack-to-rack and cooler-to-cooler interactions could be modeled directly, but, in this example, un-captured rack exhaust heats the ambient environment which in turn increases the inlet temperature of other racks. Traditional CRAC units remotely located from racks are assumed to draw airflow directly from the ambient. The Temperature Model is a physics-based technique; temperatures are rigorously computed based on the principles of conservation of mass and energy applied to a model of a known flow field. The Temperature Model itself does not employ any additional empiricism.

Figure 4:
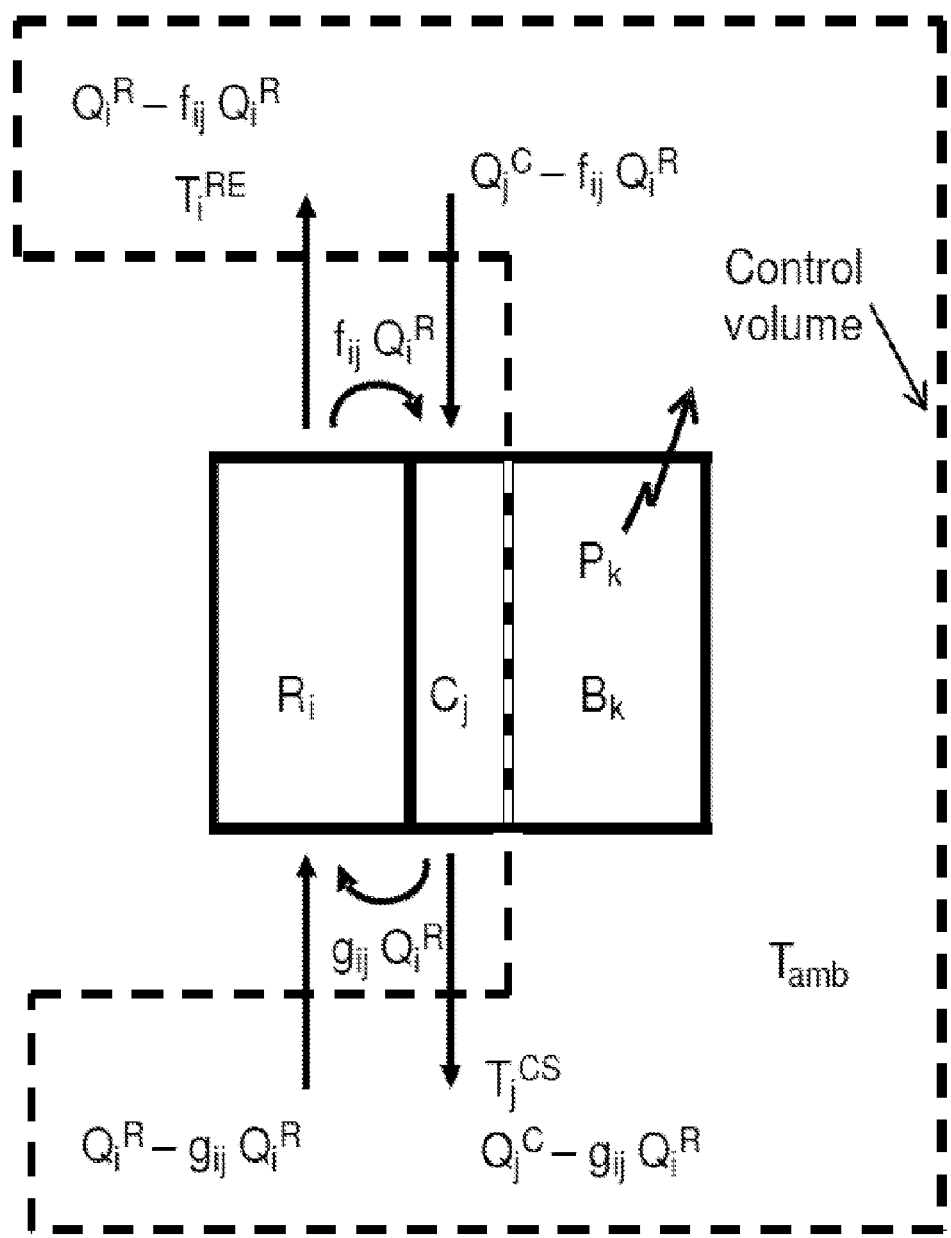
FIG. 4 is a schematic illustration of a small data center populated with one rack, one cooler, and one heated block.

FIG. 4 schematically shows an example of a small data center populated with one rack $R_i$, one cooler $C_j$, and one heated block $B_k$ which has a power dissipation of $P_k$. The dashed line is a control volume around the data center ambient air; rack-cooler airflow interactions take place outside the control volume while airflow interactions between solids, such as equipment and walls, and the ambient air occur across the control volume boundaries.

Balancing the transient energy flow across the control volume boundaries of FIG. 4 and generalizing to n racks, $N_c$ local cooling returns, and m heated blocks leads to:

$$\rho c_p \sum_{i=1}^{n} \left(1 - \sum_{j=1}^{N_c} f_{ij}\right) Q_i^R T_i^{RE} + \qquad (3)$$

$$\rho c_p \sum_{j=1}^{N} \left(Q_j^C - \sum_{i=1}^{n} g_{ij} Q_i^R\right) T_j^{CS} + \sum_{k=1}^{m} P_k + \rho c_p Q_l T_l =$$

$$\rho c_p \sum_{j=1}^{N_c} \left(Q_j^C - \sum_{i=1}^{n} f_{ij} Q_i^R\right) T_{amb} + \rho c_p \sum_{i=1}^{n} \left(1 - \sum_{j=1}^{N} g_{ij}\right) Q_i^R T_{amb} +$$

$$\rho c_p Q_{CRAC} T_{amb} + h_W A_W (T_{amb} - T_W) + \rho c_p v_R \frac{dT_{amb}}{dt}$$

where $Q_i^R$, $Q_j^C$ are the airflow rates of rack i and cooling source j respectively. $Q_l$ and $Q_{CRAC}$ are the total leakage and total CRAC airflow rates respectively. $T_i^{RE}$, $T_j^{CS}$, and $T_l$ are the exhaust temperature of rack i, the supply temperature of cooler j, and the leakage airflow temperature. $T_{amb}$ and $T_W$ are the ambient data center room temperature and the average wall temperature, respectively. The product of the density and specific heat of air, $\rho c_p$, can be taken as a constant equal to 1196 J/kg° C. The heat transfer coefficient $h_W$ is an average value for all wall surfaces and $A_W$ is the total wall surface area. $v_R$ is the volume of air in the data center room excluding the volume of equipment and the volume of air occupied by the fundamental airflow streams characterized by $f_{ij}$s and $g_{ij}$s. In practice, the latter can be estimated as the volume confined in the hot and cold aisles. Note that the heated blocks have no temperature associated with them; they simply add heat ($P_k$) to the room which increases the ambient temperature.

The transient term in Equation (3) can be approximated by a linear equation:

$$\rho c_p v_R \frac{dT_{amb}}{dt} \approx \rho c_p v_R \frac{T_{amb} - T_{amb}^-}{\Delta t} \qquad (4)$$

where $T_{amb}$ is the ambient temperature computed from the previous time step.

Other equations, as described in the '862 application, model the mixing of airflow streams entering and exiting each rack and cooler and allow all inlet and outlet temperatures to be calculated. The rack exhaust and cooler supply temperature predictions depend on the technique used to model the thermal mass of the object as explained further below.

The temperature model forms a coupled set of equations which, when solved at each time step, may provide the inlet and exhaust temperatures of all racks, the return and supply temperatures of all coolers, and the single well-mixed ambient temperature.

Discretization Methods—PFM and CFD

With PFM and CFD, the data center air volume is divided into a discrete number of grid cells. Once airflows (and, therefore, the velocities at all cell faces) are known, the temperature of each grid cell can be determined from an energy balance on each cell. A Finite-Difference or Finite-Volume approach may be used for both PFM and CFD. Finite Element or other approaches can also be used. The PCT/US11/66776 application discusses this approach in detail in the context of a coupled PFM-conduction solver application. As discussed above, the temperature portion of the problem can be solved separately from the airflow portion, even with CFD. In this case, following embodiments of the present invention, the airflow pattern may only need be computed a limited number of times and only when airflow boundary conditions change.

Modeling Thermal Mass of Racks and Coolers

The air and all solid objects inside or bounding the data center have "thermal mass," meaning that it takes a certain amount of heat transfer, e.g., W, to change the temperature of the air or object by a specified amount, e.g., ° C. It is the thermal mass of (a pre-cooled) data center that allows temperatures to remain within acceptable limits for brief periods of time without cooling. Two techniques that may be utilized for modeling the thermal mass of solid objects include the External Thermal Mass Method (ETMM) and the Internal Thermal Mass Method (ITMM).

External Thermal Mass Method

With the approach referred to here as the External Thermal Mass Method (ETMM), the rack exhaust temperature may be computed as follows:

$$T_i^{RE} = T_i^{RI} + \Delta T^R \tag{5}$$

where $\Delta T^R$ is the temperature rise across each rack j resulting from the addition of a known rack power to a known airflow rate. $T_i^{RE}$ is the rack exhaust temperature and $T_i^{RI}$ the rack inlet temperature for a given rack i. In ETMM the thermal mass of the racks is modeled by explicitly modeling conduction heat transfer in the solid object which represents the rack. The rack's ability to store heat is then modeled by this mass and heat transfer to/from this mass occurs only at fluid-solid interfaces.

In a similar fashion, transient heat transfer associated with coolers and all other solid objects takes place at the fluid-solid interfaces external to the cooler. In one scenario, cooler fans may continue to operate during a power failure but the circulation of chilled water to the cooler coils may have stopped. With the ETMM, the cooler supply temperature is equal to the cooler return temperature immediately following the power failure and the thermal mass of the cooler does not affect the temperature of the air flowing through the inside of the cooler. However, in reality, the cold coil and other internal cooler components would cause the supply temperature to rise gradually, not abruptly, following a power failure.

Figure 5:
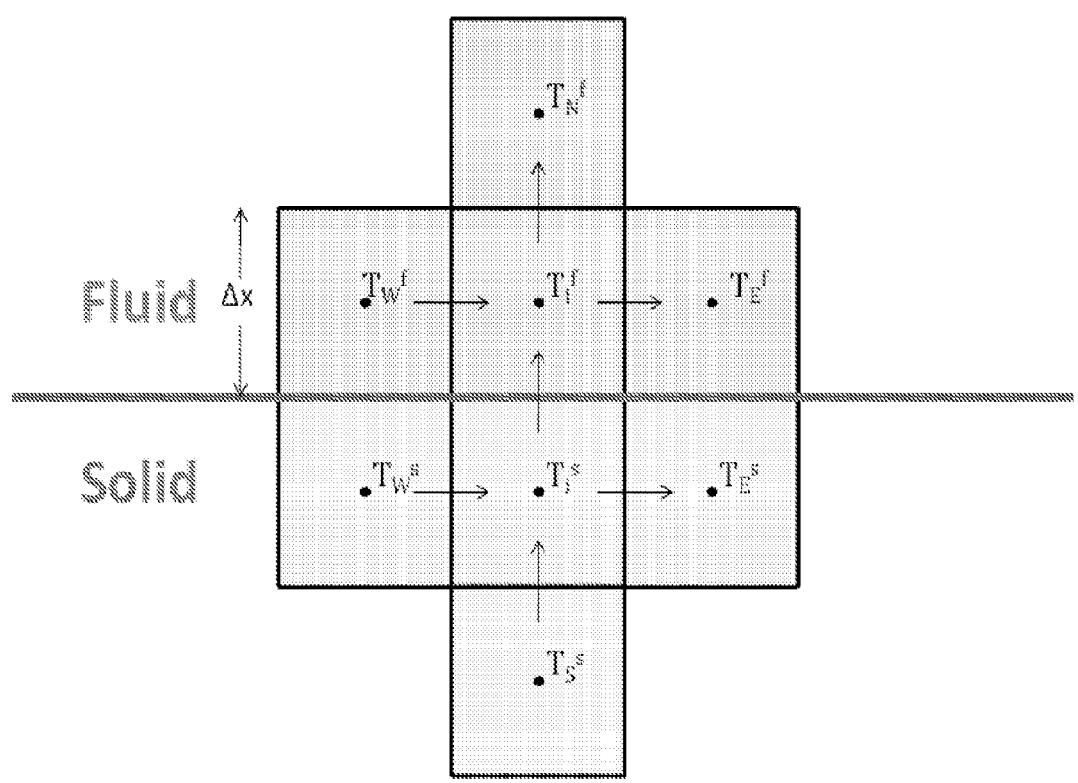
FIG. 5 demonstrates the use of grid cells in accordance with at least one example.

Referring to FIG. 5, energy flows into and out of fluid cell i due to the known velocities through three sides and through convection at the fluid-solid interface. Additionally, the fluid volume may heat up or cool down over time. This transient effect is modeled as follows:

the rate of change of stored energy = (6)

$$\rho^f c_p^f v^f \frac{dT_i^f}{dt} \approx \rho^f c_p^f v^f \frac{T_i^{f+} - T_i^f}{\Delta t}$$

where $T_i^{f+}$ is the temperature of fluid cell i after a time step of $\Delta t$, $\rho^f$ is the density of the fluid, $c_p^f$ is the specific heat of the fluid, and $v^f = \Delta x^3$ is the fluid cell volume. Including this term in an energy balance for grid cell i leads to the following expression for the temperature of the fluid cell at a future time:

$$T_i^{f+} = T_i^f + \frac{\Delta t}{\Delta x}\left[V_W(T_W^f - T_i^f) + \frac{h}{\rho^f c_p^f}(T_i^s - T_i^f)\right] \tag{7}$$

where, for this case, $V_E$, $V_N$, and $V_W$ are velocities across the east, north, and west cell faces respectively and $V_E + V_N = V_W$ as required by conservation of mass.

Similarly, an energy balance including transient heating or cooling of the solid cell of FIG. 5 leads to:

$$T_i^{s+} = T_i^s + \frac{h\Delta t}{\Delta x \rho^s c_p^s}(T_i^f - T_i^s) + \frac{k\Delta t}{\Delta x^2 \rho^s c_p^s}(T_E^s + T_W^s + T_S^s - 3T_i^s) \tag{8}$$

where the superscript "s" denotes "solid." Equations (7) and (8) are "explicit" representations of the temperature in the fluid and solid cells respectively at a future time. With this approach, the temperature over all cells can be computed sequentially at a given time step. Then, these temperatures are used on the right-hand side of Equations (7) and (8) to compute temperatures at the next time step. This process continues until the desired transient period has been covered. This very straightforward solution procedure is possible due to the fact that, in Equations (7) and (8), the temperatures of all neighboring cells in Equations (7) and (8) are evaluated at the current time. It is also possible to represent the temperatures of all neighboring cells at the future time and this is called an "implicit" approach because the temperature at cell i cannot be isolated as in Equations (7) and (8). In the "implicit" approach, the temperature of all cells ($T_i^{f+}$ or $T_i^{s+}$) may be solved for simultaneously using a solver, e.g., Gauss-Seidel iteration, at each time step. The explicit approach has the advantage of great simplicity; however, it may only converge to a sensible result if sufficiently small time steps are used. The implicit method has the advantage that it will converge regardless of time-step size and therefore, since larger time steps can be used, the total solution time may be less.

Internal Thermal Mass Method

The Internal Thermal Mass Method (ITMM) may include the thermal mass of racks and coolers in the transient analysis while not incurring any substantial solution-time penalty above and beyond the airflow and air temperature calculations. Additionally, this method may be physically more realistic than the ETMM because most of the "access" to the bulk of thermal mass of racks and coolers is via internal airflow, not the skin (typically thin metal panels) of the object. Finally, the effective transient thermal characteristics of the rack or cooler which may be used for this method may be easier to estimate (e.g., from experiment or detailed CFD) than the equivalent characteristics in the ETMM.

Equations used to apply the ITMM to a rack are as follows. Coolers and other flow objects can be modeled in an analogous manner. A transient energy balance on the entire rack yields:

$$\dot{m}_i c_p T_i^{RI} + \dot{q}_i^{IT} = \dot{m}_i c_p T_i^{RE} + (Mc_p)_i^{eff} \frac{dT_i^{eff}}{dt} \quad (9)$$

where $(Mc_p)_i^{eff}$ is the effective thermal mass (the product of the mass and specific heat) of the rack and $\dot{q}_i^{IT}$ is the total power dissipated by the IT load inside the rack. $T_i^{eff}$ is the effective temperature of the lumped rack mass. $\dot{m}_i$ is the mass airflow rate through rack i. Assuming that all heat transfer to the rack mass occurs through some effective area with an effective heat transfer coefficient $(hA)_i^{eff}$, the following equation may be obtained:

$$(Mc_p)_i^{eff} \frac{dT_i^{eff}}{dt} = (hA)_i^{eff} \left(T_i^{RI} - T_i^{eff}\right) \quad (10)$$

Equations (9) and (10) can be solved simultaneously to provide explicit representations of $T_i^{eff}$ and $T_i^{RE}$:

$$T_i^{eff} = \left(\frac{\tau_i}{\tau_i + \Delta t}\right) T_i^{eff\,old} + \left(\frac{\Delta t}{\tau_i + \Delta t}\right) T_i^{RI} \quad (11)$$

$$T_i^{RE} = T_i^{RI} + \frac{\dot{q}_i^{IT}}{\dot{m}_i c_p} + \left(\frac{\tau_i}{\tau_i + \Delta t}\right) \frac{(hA)_i^{eff}}{\dot{m}_i c_p} \left(T_i^{eff\,old} - T_i^{RI}\right) \quad (12)$$

where $$\tau_i \equiv \text{Rack Thermal Time Constant} = \frac{(Mc_p)_i^{eff}}{(hA)_i^{eff}} \quad (13)$$

and $T_i^{eff\,old}$ is the temperature of lumped rack mass in the previous time period.

Equations (11)-(13) may then be used to estimate the rack's effective and exhaust temperature at each time step in the analysis. The rack thermal time constant which emerges from the above analysis characterizes the time scale over which transient heating or cooling of the rack takes place. For example, a large time constant implies a very large thermal mass or slow heat exchange with the airstream and the effective rack temperature will change very slowly over time. As the rack thermal time constant approaches zero, the rack exhaust temperature is the inlet temperature plus $$\Delta T_i^R = \frac{\dot{q}_i^{IT}}{\dot{m}_i c_p}.$$

Coolers are modeled in an analogous fashion. There is no internal power dissipation and the heat transfer is typically in the direction from the inlet air to the effective internal surfaces of the cooler at $T_{eff}$. Additionally, if the coolers continue to circulate cooling water (but perhaps at an ever increasing temperature before the chiller is returned to service), embodiments of the invention may include this effect in Equations (9) and (10).

Example Embodiments of the Invention

Table 1 below illustrates various combinations of airflow and temperature prediction methods which may utilized in various embodiments of the present invention. As illustrated in Table 1, if only the fundamental airflows are to be calculated, the Algebraic Calculator coupled with the Temperature Model and Internal Thermal Mass Method (ITMM) for air and solid temperatures respectively may be preferred. PFM or CFD could be used to predict the fundamental airflows if solution accuracy were deemed more important than solution time, cost, stability, etc. With full field airflow calculations, PFM coupled with discretized air temperature calculations and the ITMM may be preferred. Again, CFD could be used in some embodiments for airflow predictions, if solution accuracy were deemed the most important consideration.

TABLE 1

|  | Fundamental Airflows | Full-Field Calculations |
| --- | --- | --- |
| Airflow Pattern Calculation | Algebraic Calculator PFM CFD | PFM CFD |
| Air Temperature Calculation | Temperature Model ITMM | Discretization Method ITMM |
| Models for Thermal Mass of Racks and Coolers | ITMM | ITMM ETMM |

Transient Analysis Example Input Scenarios

Figure 7:
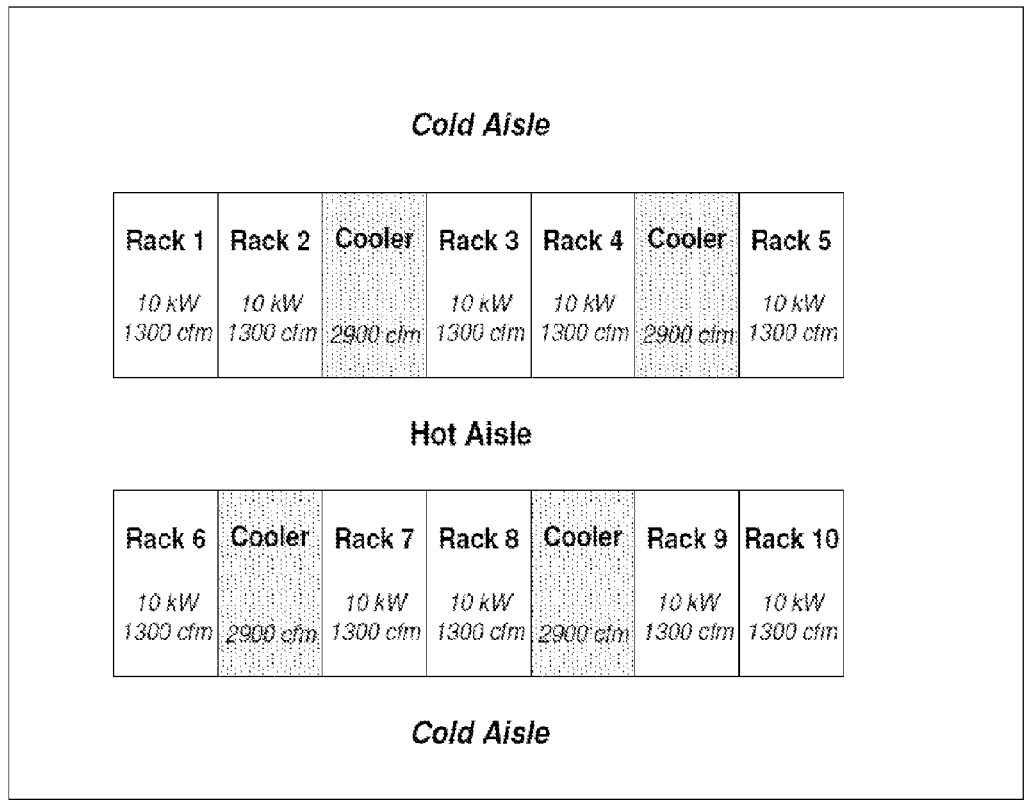
FIG. 7 is a schematic diagram of a data center in accordance with on example.

In accordance with some embodiments, there is provided a method by which software users can specify the overall nature of a transient analysis they wish to investigate. Such an investigation may involve, for example, predicting the effect of a power failure on various temperatures in the data center. An example of an interface which a user may utilize to specify a particular scenario is illustrated in FIG. 6. This interface may be included in a software tool and may be presented on a display of a computer. As indicated by the checked boxes in FIG. 6, the user has specified that major cooling equipment excluding chillers are connected to an Uninterruptable Power Supply (UPS). Since the UPS runtime (10 min) is greater than the generator start time, the cooler fans and chilled water pumps will be able to run for an indefinite period of time (so long as the generators continue to run). The chiller, however, is not connected to a UPS (as may be the case because of its large power requirements) so the chilled water in the piping system and emergency reservoir (if applicable) will continue to circulate and heat up until the chiller is back on line. The details of such scenarios are provided in the '592 patent. This example will illustrate the prediction of rack and other specific temperatures throughout the data center. For the example scenario indicated in FIG. 6, only one airflow pattern is predicted as racks and cooler airflow patterns are unchanged throughout the transient analysis. However, three distinct time periods exist between transient events during which air and solid-object temperatures may be analyzed:

1. The initial steady-state period
2. The period after the power failure until the chiller re-starts
3. The period after the chiller re-starts until temperatures return to steady-state values Algebraic Airflow—Temperature Model Example In the following example, the algebraic model is used to calculate airflow patterns before and after a failure event and the Temperature Model is used to compute the transient air temperature changes over time. The example assumes a data center including ten equipment racks and four coolers arranged as illustrated in FIG. 7, where the power utilization and airflow of each of the racks and the airflow of each of the coolers is as indicated. For convenience, the thermal mass of solid objects is not included in the example, but, in practice, the Internal Thermal Mass Method may be used with the Algebraic Airflow method and Temperature Model with almost no additional computation time. The Algebraic Airflow—Temperature Model combination allows transient scenarios to be analyzed in real time even for large, practical facilities. In this approach temperatures may be computed for the inlet and outlet of all racks and coolers—plus one well-mixed ambient temperature. In some embodiments, air temperatures everywhere in the data center may not be available for display.

It is assumed that the upper-right cooler in FIG. 7 fails at time t=0. Two airflow patterns are computed: the steady-state airflow pattern that existed prior to t=0 with all coolers running and the one after t=0 with one cooler failed. Calculations may be performed essentially instantaneously using the algebraic airflow models and the Temperature Model.

Figure 8A:
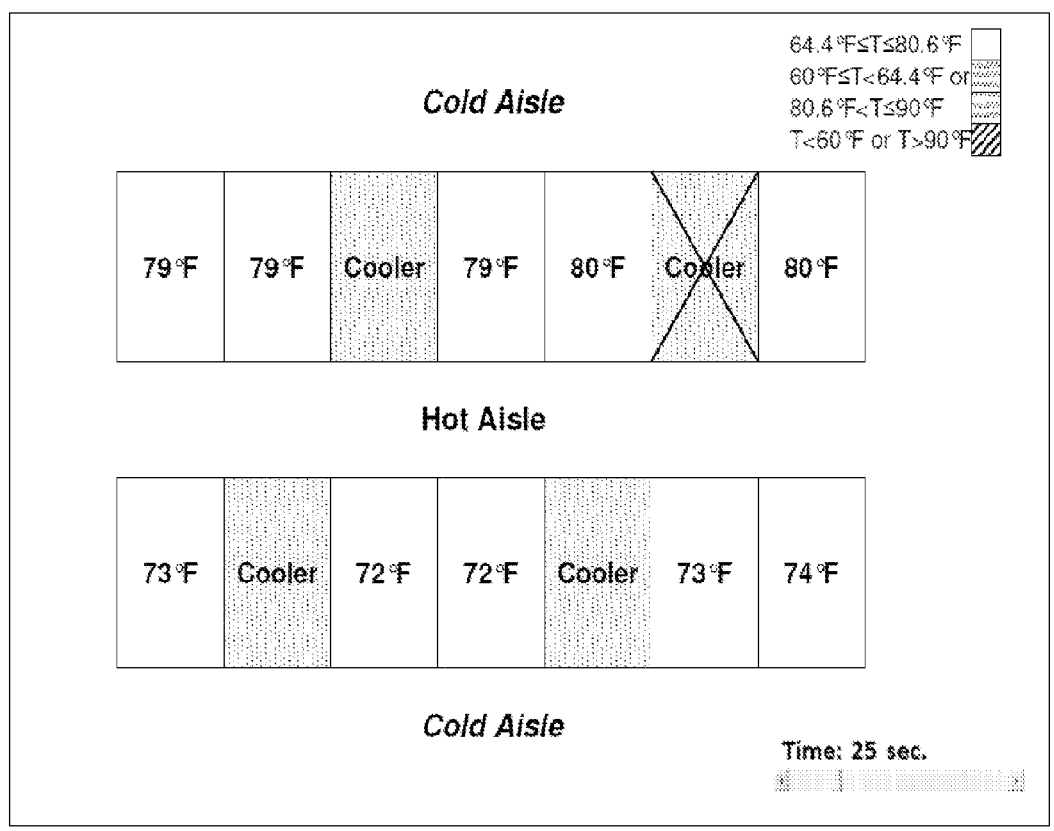
FIG. 8A is a schematic diagram of the data center of FIG. 7 at a first time period after the failure of a cooler.
Figure 8B:
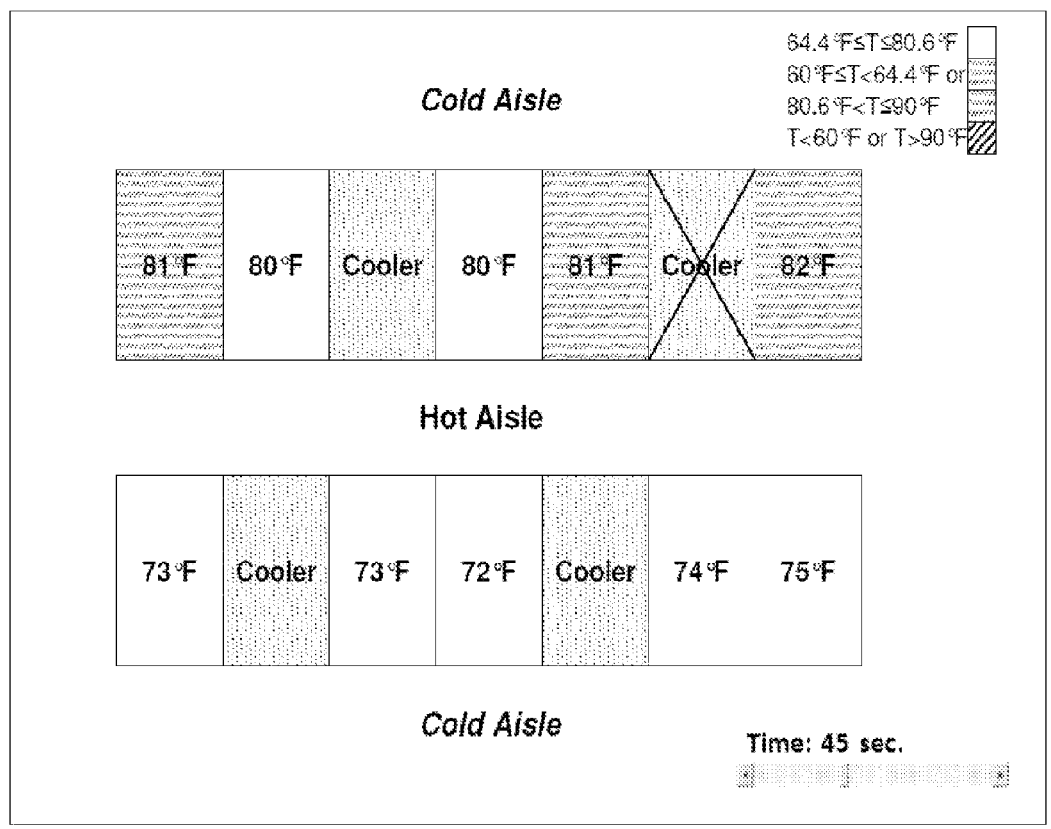
FIG. 8B is a schematic diagram of the data center of FIG. 7 at a second time period after the failure of a cooler.

FIGS. 8A and 8B show racks patterned based on inlet temperature; a slider-bar allows the user to inspect the results at any instant in time. The temperature levels here are based on the ASHRAE Thermal Guidelines (ASHRAE. 2008. Thermal Guidelines for Data Processing Environments. Atlanta: American Society of Heating, Refrigerating, and Air-Conditioning Engineers, Inc.) with racks with temperatures in a recommended temperature range being indicated without patterning, and racks with temperatures in an allowable temperature range being indicated with hash marks. Racks 1, 4, and 5 are within the recommended range at t=25 seconds (see FIG. 8A), but are above the recommended temperature threshold 45 seconds after the cooler failure (see FIG. 8B where these racks are illustrated with hash marks).

Figure 9:
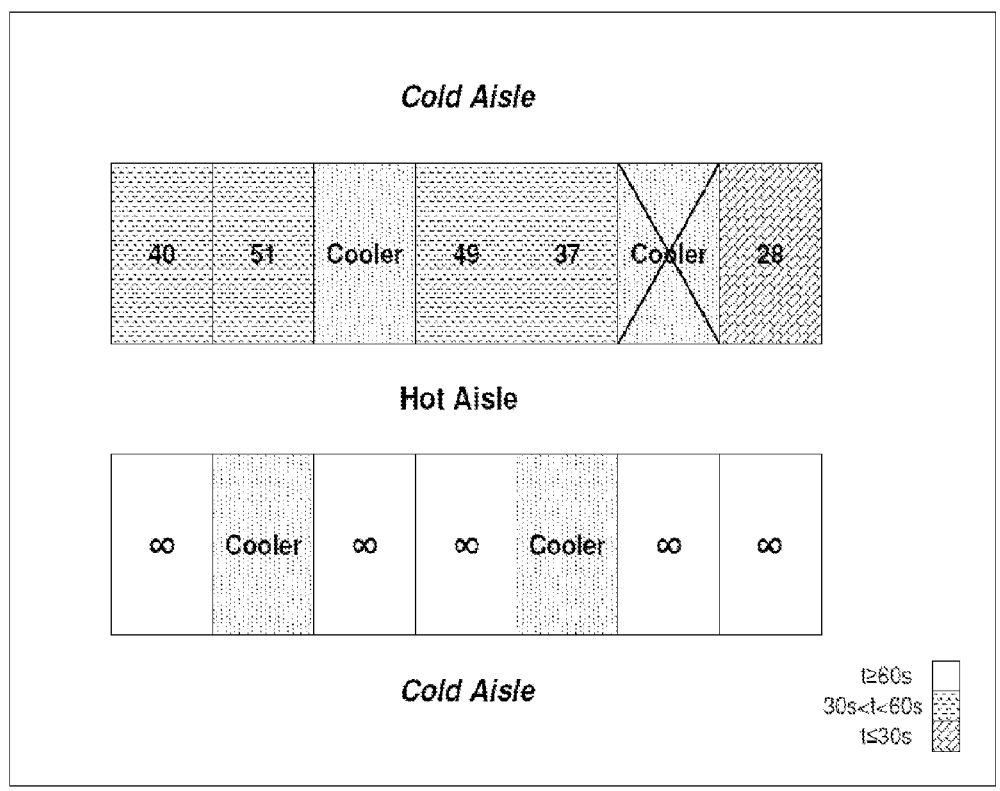
FIG. 9 is a schematic diagram of the data center of FIG. 7 indicating cooling runtime after failure of a cooler.

Cooling runtime may be defined as the time it takes for a rack inlet temperature to reach its maximum allowable temperature. If the rack inlet temperature never reaches the threshold, then the cooling runtime is taken as infinity. FIG. 9 shows how cooling runtime may be presented to the user. All times are in seconds and racks may be patterned as indicated in the legend in FIG. 9 based on user-specified limits. In the illustrations in FIGS. 8A, 8B, and 9, it should be understood that in other embodiments, other indicators of a particular temperature range or time until a particular temperature is reached, for example, by color coding, may be used.

Figure 10:
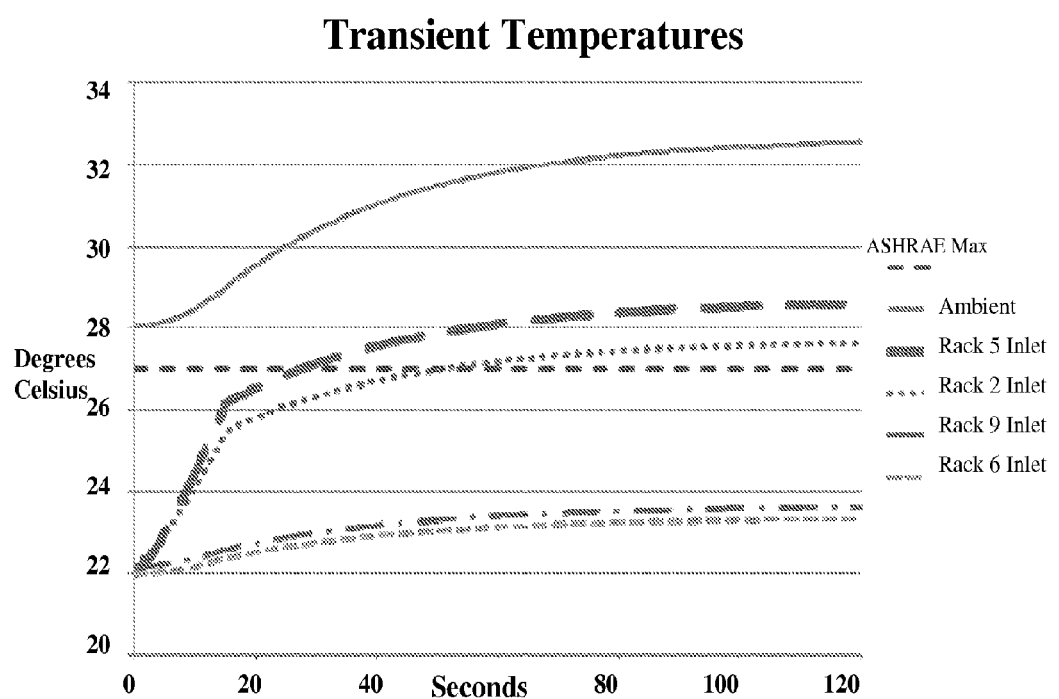
FIG. 10 is an example of an illustration of temperature vs. time for racks in the data center of FIG. 7 after failure of a cooler.

In some embodiments, users can also view the temperature changes of each rack versus time as shown in FIG. 10. For this example, racks in the row opposite the cooler failure (Racks 6 and 9, shown in FIG. 7) never exceed the allowable temperature.

PFM Airflow—Discretized PFM Temperatures Example

Figure 11A:
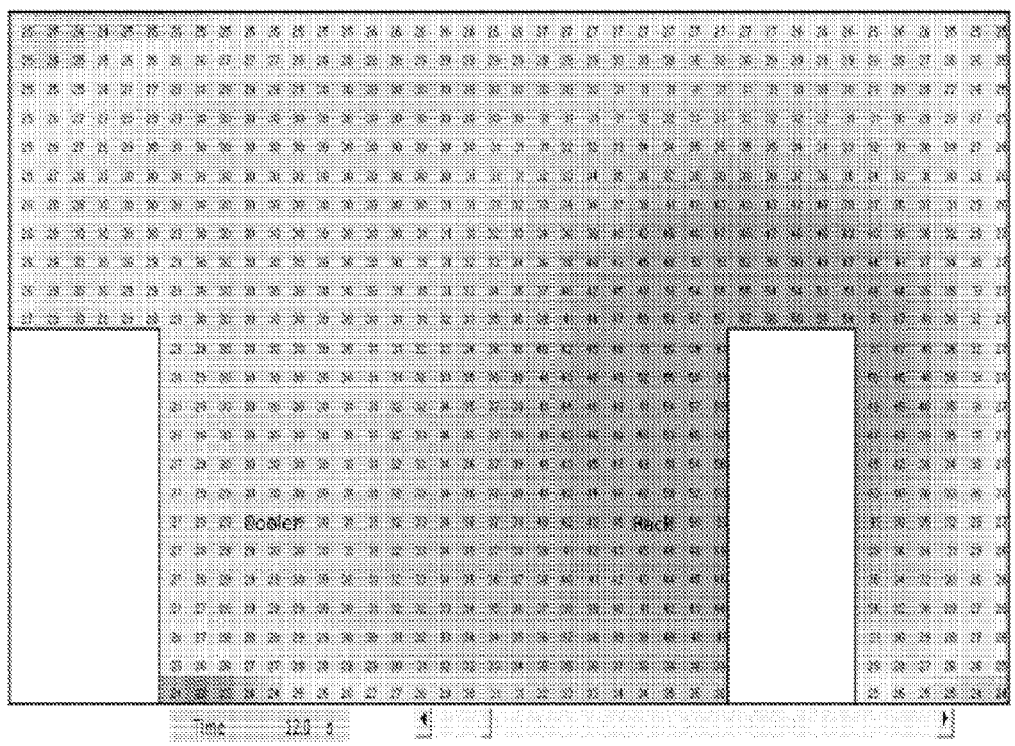
FIG. 11A is an example of an illustration of temperature distribution in a data center at a specific time after a cooling system event.

In another example, the PFM approach for computing both airflow and temperatures is used in the 2D data center layout shown in FIG. 11A. The External Thermal Mass Method is used to model heat exchange with the cooler and rack, but, for simplicity, the cooler, rack, and all bounding walls are maintained at a temperature of 20° C. throughout the transient analysis. This assumption is equivalent to assuming that all solid objects have a very large thermal mass compared to the thermal mass of the air. This assumption could be used accurately in the very early stages of a transient analysis but may be inappropriate over a time period sufficiently long such that the temperatures of solid objects changed appreciably. In that case, if the ETMM is to be used, the solid objects would also be discretized and solid cell temperatures would be computed using equations similar to Equation (8).

Figure 11B:
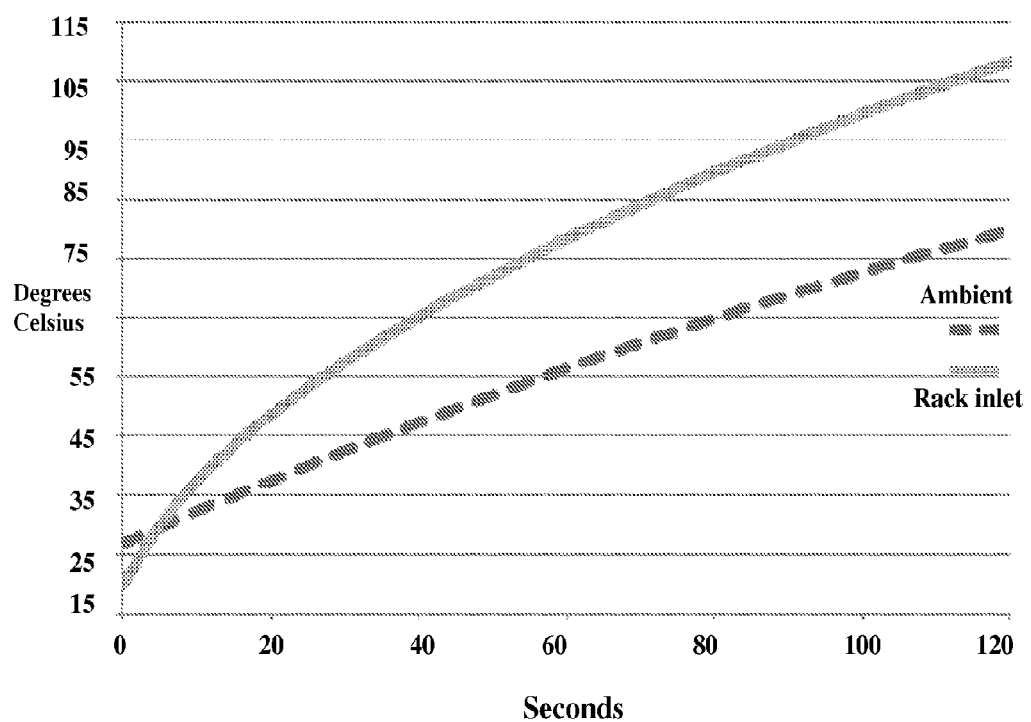
FIG. 11B is an example of an illustration of temperature over time for a rack in a data center after a cooling system event.

Prior to t=0, the cooler is operating and airflow is supplied in front of the rack through a perforated tile located immediately to the right of the rack in FIG. 11A. At t=0, the cooler fails and the airflow pattern is subsequently driven only by the rack airflow. Two airflow patterns are computed by PFM: the initial steady-state airflow pattern including the functioning cooler and the airflow pattern after t=0 in which there is no cooler-return airflow or perforated-tile supply airflow. FIG. 11A shows example temperatures throughout the space at t=12 seconds. FIG. 11B shows the rack inlet and ambient temperatures (in this example, ambient temperature is the cell-based average room temperature) through a two minute period. Note that an important aspect of the PFM approach is that it allows the full temperature distribution in the data center to be displayed to the user at any desired time during the transient analysis.

In embodiments above, processes and systems are provided that can determine relevant temperatures in a data center, and model the effect of transient disruptions in cooling system operations on these temperatures. The systems and methods can be used to provide optimized design of a data center by using results of the systems and methods to change the actual layout and/or capacity of equipment or the proposed layout and/or capacity of equipment. In processes described above, values related to data center cooling, including airflows and temperatures may be determined. In at least some embodiments, the values determined are predictions for actual values that will occur in a data center having the parameters modeled. In methods of at least one embodiment of the invention, after successful modeling of a cluster in a data center, the results of the model may be used as part of a system to order equipment, ship equipment and install equipment in a data center as per the designed layout.

In at least some embodiments described herein, airflow in a plenum is described as being generated by a CRAC. Systems and methods described herein can be used with other types of sources of air in plenums, including other types of cooling devices and fans. In at least some embodiments, methods are described as determining specific airflows and the change in these airflows resulting from a disruption in the operation of a cooling system. In at least some embodiments, the determination is a prediction or estimation of actual airflows.

In at least some embodiments of the invention discussed herein, the performance of assessments and calculations in real-time refers to processes that are completed in a matter of a few seconds or less rather than several minutes or longer as can happen with complex calculations, such as those involving typical CFD calculations.

In at least some embodiments described above, the design of a data center and/or actual parameters in a data center are altered based on predicted temperature and/or airflow and/or the change in temperature and/or airflow upon the occurrence of a cooling system failure in a data center. For example, a user of the data center design and management system may change the location of coolers or the types of coolers that are used in the actual layout of equipment or the proposed layout of equipment in the data center. These alterations may be implemented to improve the cooling performance and/or may be implemented to provide cost and/or power savings when the performance is found to be within predetermined specifications. Further, based on determined airflow values, a data management system in accordance with one embodiment, may control one or more CRACs to adjust the airflow, and in addition, one or more equipment racks can be controlled to reduce power if the airflow is not adequate to provide sufficient cooling.

In at least some embodiments described above, tools and processes are provided for determining temperatures and airflows in a data center. In other embodiments, the tools and processes may be used in other types of facilities, and may also be used in mobile applications, including mobile data centers. Further, processes and systems in accordance with embodiments described herein may be used in overhead air plenums, and other types of air plenums.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer-implemented method for evaluating cooling performance of equipment in a data center, the equipment including a plurality of equipment racks and at least one cooling provider, the method comprising:
   receiving data related to types of equipment and an arrangement of equipment in the data center;
   determining first parameters related to airflow and parameters related to temperature in the data center at a first period in time, the first parameters related to airflow including a fraction of airflow from a rack which is captured by a cooling source and a fraction of the rack's inlet airflow which originated from the cooling source;
   receiving a description of a transient event affecting one of airflow and temperature in the data center and occurring at a second time subsequent to the first period in time, the transient event including failure of the at least one cooling provider;
   breaking a second time period subsequent to the second time into a plurality of time intervals;
   determining second parameters related to airflow in the data center during one of the plurality of time intervals, the second parameters related to airflow including the fraction of airflow from the rack which is captured by the cooling source and the fraction of the rack's inlet airflow which originated from the cooling source;
   determining the parameters related to temperature in the data center at each of the plurality of time intervals based on the second parameters related to airflow;
   storing, on a storage device, a representation of the parameters related to temperature in the at least a portion of the data center during the second time period; and
   one of controlling one or more computer room air conditioners (CRACs) to adjust airflow in the data center and controlling one or more equipment racks in the data center to reduce power based on the determined second parameters related to airflow if the airflow is not adequate to provide sufficient cooling.

2. The computer implemented method of claim 1, wherein receiving the description of the transient event comprises receiving a description of a period of time over which the transient event affects one of the airflow and the temperature in the data center.

3. The computer implemented method of claim 1, further comprising determining a temperature of inlet air of each of the plurality of equipment racks during each of the plurality of time intervals of the second time period.

4. The computer implemented method of claim 3, further comprising providing an indication of whether any of the plurality of equipment racks achieves an unacceptable temperature during a user selectable time period subsequent to the second time.

5. The computer implemented method of claim 4, further comprising providing an indication of time period subsequent to the second time during which an equipment rack of the plurality of equipment racks receives inlet air at a temperature below a user defined acceptable temperature.

6. The computer implemented method of claim 3, wherein a temperature of one of an exhaust of each of the plurality of equipment racks and a supply of the at least one cooling provider during each of the plurality of time intervals of the second time period is calculated using an internal thermal mass method.

7. The computer implemented method of claim 3, further comprising providing an indication of a change in temperature of at least one of the inlet air and an exhaust of the plurality of equipment racks during the second time period.

8. The computer implemented method of claim 1, wherein one of the first parameters related to airflow and the second parameters related to airflow in the data center are determined using a computational method independent of a different computational method used to determine the parameters related to temperature in the data center.

9. The computer implemented method of claim 1, wherein one of the first parameters related to airflow and the second parameters related to airflow are determined using one of a computational fluid dynamics process and a potential flow model analysis.

10. The method of claim 1, wherein determining the first parameters related to temperature includes determining temperature within the rack.

11. A system for evaluating equipment in a data center, the equipment including a plurality of equipment racks, and at least one cooling provider, the system comprising:
   an interface; and
   a controller coupled to the interface and configured to:
      receive data related to types of equipment and an arrangement of equipment in the data center;
      determine first parameters related to airflow and parameters related to temperature in the data center at a first period in time, the first parameters related to airflow including a fraction of airflow from a rack which is captured by a cooling source and a fraction of the rack's inlet airflow which originated from the cooling source;
      receive a description of a transient event affecting one of airflow and temperature in the data center and occurring at a second time subsequent to the first period in time, the transient event including failure of the at least one cooling provider;
      break a second time period subsequent to the second time into a plurality of time intervals;

determine second parameters related to airflow in the data center during one of the plurality of time intervals, the second parameters related to airflow including the fraction of airflow from the rack which is captured by the cooling source and the fraction of the rack's inlet airflow which originated from the cooling source;

determine the parameters related to temperature in the data center at each of the plurality of time intervals based on the second parameters related to airflow;

store, on a storage device, a representation of the parameters related to temperature in the at least a portion of the data center during the second time period; and one of control one or more computer room air conditioners (CRACs) to adjust airflow in the data center and control one or more equipment racks in the data center to reduce power based on the determined second parameters related to airflow if the airflow is not adequate to provide sufficient cooling.

12. The system of claim 11, wherein the controller is further configured to determine a temperature of inlet air of each of the plurality of equipment racks during each of the plurality of time intervals of the second time period.

13. The system of claim 12, wherein the controller is further configured to determine the temperature the inlet air of each of the plurality of equipment racks during each of the plurality of time intervals of the second time period using an internal thermal mass method.

14. The system of claim 11, wherein the controller is configured to determine one of the first parameters related to airflow and the second parameters related to airflow in the data center using an algebraic model and to determine the parameters related to temperature in the data center using a Temperature Model.

15. The system of claim 14, wherein the controller is configured to determine one of the first parameters related to airflow and the second parameters related to airflow using one of a computational fluid dynamics process and a potential flow model analysis.

16. A non-transitory computer readable medium having stored thereon sequences of instruction including instructions that will cause a processor to:

receive data related to types of equipment and an arrangement of equipment in the data center;

determine first parameters related to airflow and parameters related to temperature in the data center at a first period in time;

receive a description of a transient event affecting one of airflow and temperature in the data center and occurring at a second time subsequent to the first period in time, the transient event including failure of the at least one cooling provider;

break a second time period subsequent to the second time into a plurality of time intervals;

determine second parameters related to airflow in the data center during one of the plurality of time intervals;

determine the parameters related to temperature in the data center at each of the plurality of time intervals based on the second parameters related to airflow;

store, on a storage device, a representation of the parameters related to temperature in the at least a portion of the data center during the second time period; and one of control one or more computer room air conditioners (CRACs) to adjust airflow in the data center and control one or more equipment racks in the data center to reduce power based on the determined second parameters related to airflow if the airflow is not adequate to provide sufficient cooling.

17. The computer readable medium of claim 16, wherein the sequences of instructions further include instructions that will cause the processor to determine a temperature of inlet air of each of the plurality of equipment racks during each of the plurality of time intervals of the second time period.

18. The computer readable medium of claim 17, wherein the sequences of instructions further include instructions that will cause the processor to provide an indication of whether any of the plurality of equipment racks achieves an unacceptable temperature during a user selectable time period subsequent to the second time.

19. The computer readable medium of claim 18, wherein the sequences of instructions further include instructions that will cause the processor to provide an indication a cooling runtime subsequent to the second time of the plurality of equipment racks.

20. The computer readable medium of claim 17, wherein the sequences of instructions further include instructions that will cause the processor to provide an indication of a change in temperature of at least one of the inlet air and an exhaust of the plurality of equipment racks during the second time period.

21. The computer readable medium of claim 16, wherein the sequences of instructions further include instructions that will cause the processor to determine the temperature of inlet air of each of the plurality of equipment racks during each of the plurality of time intervals of the second time period using an internal thermal mass method.

* * * * *